United States Patent
O'Brien

(10) Patent No.: US 12,488,345 B1
(45) Date of Patent: Dec. 2, 2025

(54) DECENTRALIZED INTEGRATION SOLUTIONS FOR SECURELY CONDUCTING LEGAL TRANSACTIONS AND PROTECTING SENSITIVE DATA

(71) Applicant: BJustCoin IP Holding LLC, Sheridan, WY (US)

(72) Inventor: Beatrice T. O'Brien, Short Hills, NJ (US)

(*) Notice: Subject to any disclaimer, the term of this patent is extended or adjusted under 35 U.S.C. 154(b) by 0 days.

(21) Appl. No.: 19/089,705

(22) Filed: Mar. 25, 2025

(51) Int. Cl.
*G06Q 20/40* (2012.01)

(52) U.S. Cl.
CPC ................................. *G06Q 20/401* (2013.01)

(58) Field of Classification Search
CPC .................................................... G06Q 20/401
See application file for complete search history.

(56) References Cited

U.S. PATENT DOCUMENTS

| | | | |
|---|---|---|---|
| 2008/0059209 A1 | 3/2008 | Larsen | |
| 2017/0323305 A1 | 11/2017 | Pradeep | |
| 2019/0180240 A1* | 6/2019 | O'Brien | H04L 67/02 |
| 2019/0182299 A1* | 6/2019 | O'Brien | H04L 65/4015 |
| 2020/0193425 A1* | 6/2020 | Ferenczi | G06Q 20/3829 |
| 2020/0267163 A1 | 8/2020 | Wilson | |
| 2020/0351089 A1* | 11/2020 | Wentz | H04L 9/3236 |
| 2020/0374113 A1* | 11/2020 | Noam | H04L 9/0637 |
| 2021/0049288 A1* | 2/2021 | Li | H04L 9/3239 |
| 2021/0082068 A1* | 3/2021 | O'Brien | H04L 9/3247 |
| 2021/0133701 A1* | 5/2021 | Chen | H04L 63/0823 |
| 2022/0036373 A1* | 2/2022 | O'Brien | G06Q 50/18 |
| 2022/0094675 A1* | 3/2022 | Madisetti | H04L 9/14 |
| 2022/0200805 A1 | 6/2022 | Varilly et al. | |
| 2022/0215471 A1 | 7/2022 | Simpson | |
| 2023/0259918 A1* | 8/2023 | Rao | G06Q 20/4014 705/67 |
| 2023/0351535 A1 | 11/2023 | Hunn et al. | |
| 2024/0370865 A1* | 11/2024 | Bernardi | G06Q 20/36 |

OTHER PUBLICATIONS

Amin (A New Frontier in Online Dispute Resolution: Combining AI and Mindfulness, Journal of Law, Technology, & The Internet â¢ vol. 15 â¢ Issue 2, 2024, pp. 283-304) (Year: 2024).*
Nominis (Legal Tokenization and Wallet Compliance, Jan. 29, 2025, 5 pages) (Year: 2025).*
Gorman (What Is a Decentralized Autonomous Organization (DAO)? 2023, 13 pages) (Year: 2023).*

* cited by examiner

*Primary Examiner* — Oleg Korsak
(74) *Attorney, Agent, or Firm* — Kevin Paganini, Esq.

(57) ABSTRACT

This disclosure relates to decentralized integration solutions for securely conducting legal transactions and/or other types of transactions. In certain embodiments, a transaction platform includes a decentralized network integration system that interfaces with decentralized network systems, including blockchain and/or distributed storage systems, to securely conduct legal transactions and/or other types of transactions. The transaction platform can protect sensitive data associated with the transactions using techniques that combine zero-knowledge proofs (ZKP) with blockchain-based smart contract technologies. The transaction platform also can protect the integrity of transaction documentation using techniques that combine distributed storage and smart contract technologies. This disclosure also describes techniques for implementing AI-powered dispute resolution processes and tokenized ecosystems on the transaction platform.

20 Claims, 8 Drawing Sheets

DECENTRALIZED INTEGRATION SOLUTIONS FOR SECURELY CONDUCTING LEGAL TRANSACTIONS AND PROTECTING SENSITIVE DATA

TECHNICAL FIELD

This disclosure relates to decentralized integration solutions for securely conducting legal transactions and/or other types of transactions. This disclosure describes techniques for protecting sensitive data associated with the transactions by combining zero-knowledge proofs (ZKP) with smart contracts hosted on blockchain networks. This disclosure also describes techniques for protecting the integrity of transaction documentation by combining distributed storage and smart contract technologies. This disclosure also describes techniques for implementing AI-powered dispute resolution processes.

BACKGROUND

In recent years, there has been a significant increase in the number and sophistication of cyberattacks, posing substantial threats to individuals, businesses, and governments worldwide. Cybercriminals employ various methods to exploit vulnerabilities in digital systems, including attacks in the form of ransomware, phishing, denial of service (DoS) attacks, and data breaches, amongst others. The recent trend of ransomware attacks has been particularly concerning, as these types of attacks typically involve the deployment of malicious software that encrypts a victim's data, rendering it inaccessible until a ransom is paid. These cyberattacks not only result in financial losses, but also compromise security and expose confidential data.

Traditionally, cyberattacks were predominantly a concern for governmental and defense entities. However, in recent years, the landscape of cyber threats has evolved, with attacks becoming pervasive across all types of commercial businesses. This shift is largely due to the increasing digitalization of business operations and the valuable data that commercial entities hold.

Law firms and other entities that hold confidential information (e.g., accounting firms, financial institutions, consultant agencies, etc.), in particular, have seen a significant uptick in cyberattacks. These entities often store a wealth of confidential information and documents, including client data, sensitive communications, PII (personally identifiable information), and financial information. Cybercriminals target these firms to gain access to this confidential data (and/or to take control of systems that store this confidential data) for various nefarious goals, such as extorting a ransom, publicly exposing confidential data, or even blackmail.

Cyberattacks are particularly concerning for law firms due to the critical importance of maintaining attorney-client privilege and the confidentiality of sensitive information. Law firms handle a vast array of sensitive documentation, including legal briefs, contracts, client communications, and personal identification information, all of which are highly attractive targets for cybercriminals. A data breach can lead to unauthorized access to this information, potentially compromising client confidentiality and damaging the firm's reputation. Moreover, the nature of a law firm's work, which often relies heavily on document drafting and management, means that a successful ransomware attack could disrupt operations entirely. As such, law firms require robust cybersecurity measures to protect their operations and uphold the integrity of their client relationships.

The vulnerability of law firms (and other entities) to cyberattacks can be attributed, at least in part, to their reliance on a centralized infrastructure for maintaining and storing sensitive data. This centralized approach means that if a breach occurs, it can potentially expose the entirety of the company's data, including confidential client information, legal documents, and sensitive communications. Centralized systems create a single point of failure, making them attractive targets for cybercriminals seeking to exploit weaknesses and gain access to valuable information. Once infiltrated, attackers can access vast amounts of data, leading to significant security breaches and operational disruptions. The centralized information technology (IT) model not only increases the risk of data exposure, but also complicates recovery efforts, as the entire system may need to be secured and restored.

The vulnerability of law firms (and other entities) to cyberattacks also can be attributed, at least in part, to the manner in which these entities collect and exchange information with clients. Traditional methods of information exchange often involve the transmission and storage of sensitive data in unencrypted or poorly secured formats (e.g., via email or web forms), making it susceptible to interception and unauthorized access. This exposure is exacerbated by the reliance on centralized systems, which create single points of failure that can be exploited by cybercriminals.

Beyond the threats posed by cybercriminals aiming to access confidential data, clients or customers are also vulnerable to fraud, especially when initiating a new relationship with a law firm or other entity. In certain situations, malicious actors may impersonate attorneys, accountants, or other professionals to gain access to clients' sensitive information or to extort money. Additionally, there are instances where attorneys or other professionals may themselves engage in fraudulent activities or mismanage client funds. Consequently, clients seeking the services of legal or other professionals must undertake the arduous task of manually researching and vetting service providers to verify their legitimacy. This process can be time-consuming and challenging, and it does not guarantee the security or legitimacy of the service providers.

While decentralized and/or blockchain-based architectures offer promising solutions for enhancing security and transparency in conducting legal and other transactions, they also present significant technical challenges that can hinder widespread adoption. Traditionally, these systems often necessitate a certain degree of technical proficiency from end-users, such as the ability to set up and manage digital wallets or accounts on blockchain networks, and an understanding of how to initiate and manage transactions within these decentralized environments. These technical knowledge obstacles can be a substantial barrier to entry, particularly in fields like law, where professionals may not have the time or inclination to acquire such skills. Consequently, the complexity associated with these technologies can deter potential users from integrating decentralized and/or blockchain-based solutions into their systems.

In view of the foregoing, there is a growing need for decentralized architectures and data management solutions to eliminate, or at least mitigate, cyberattack risks and enhance the protection of sensitive information within law firms and other entities. There also is a need to implement such decentralized architectures in a manner that enables non-technical end-users to benefit from enhanced security and privacy associated with such systems without having to manage the technical complexities associated with blockchain or decentralized technologies.

The background description provided herein is for the purpose of generally presenting the context of the disclosure. The materials described in this section are not prior art to the claims in this application and are not admitted to be prior art, or suggestions of the prior art, by inclusion in this section.

BRIEF DESCRIPTION OF DRAWINGS

To facilitate further description of the embodiments, the following drawings are provided, in which like references are intended to refer to like or corresponding parts, and in which.

Figure 1A:
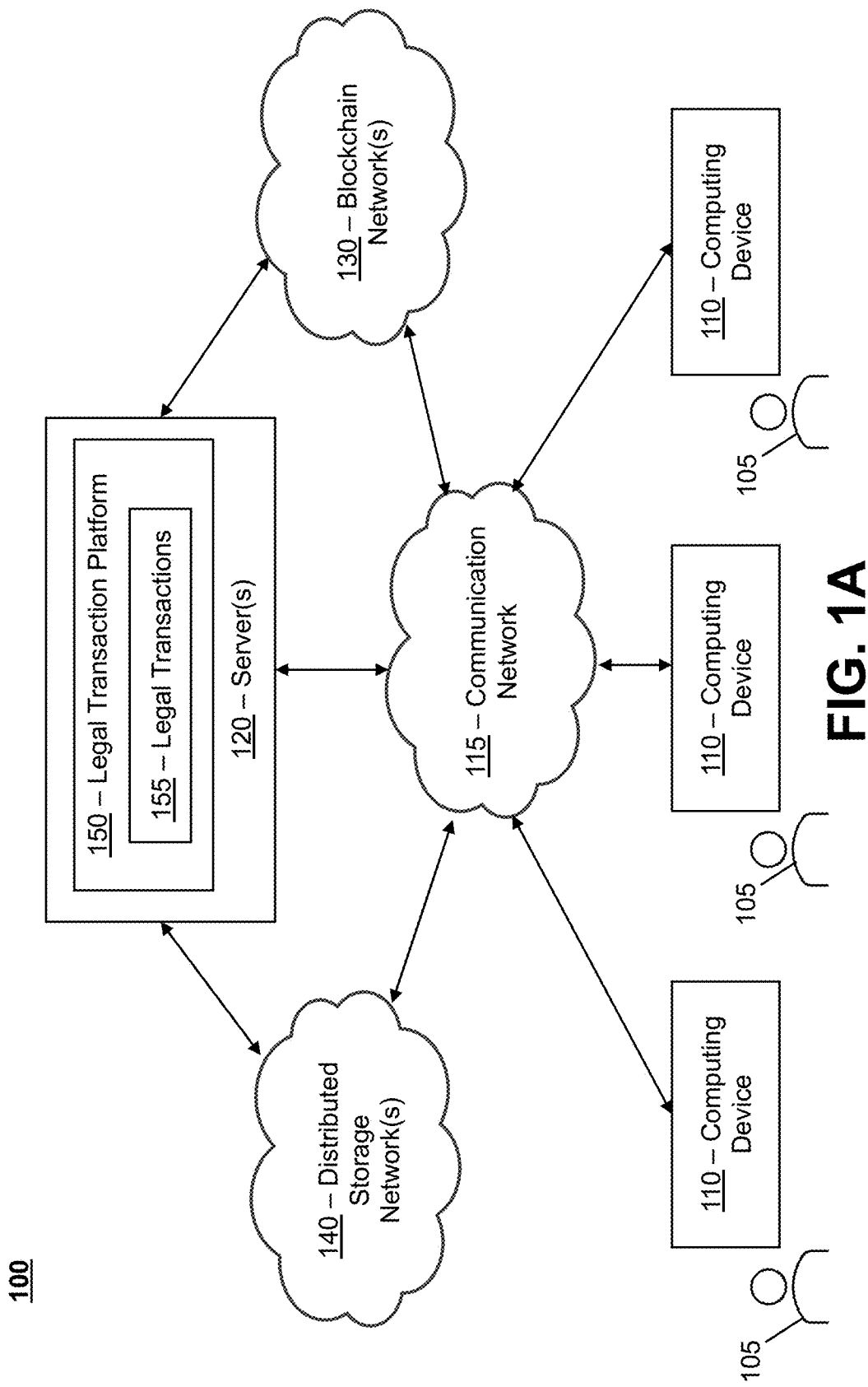
FIG. 1A is a network diagram of an exemplary system for conducting legal transactions in accordance with certain embodiments.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein.

The terms "left," "right," "front," "rear," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

As used herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

Certain data or functions may be described as "real-time," "near real-time," or "substantially real-time" within this disclosure. Any of these terms can refer to data or functions that are processed with a humanly imperceptible delay or minimal humanly perceptible delay. Alternatively, these terms can refer to data or functions that are processed within a specific time interval (e.g., in the order of milliseconds).

DETAILED DESCRIPTION OF EXEMPLARY EMBODIMENTS

The present disclosure relates to systems, methods, apparatuses, computer program products, and techniques for securely conducting legal transactions and/or protecting legal documentation using blockchain-based architectures and technologies.

In certain embodiments, a legal transaction platform provides an environment that facilitates communications between client end-users and professional end-users, and permits the end-users to engage in various types of legal transactions via the platform. The legal transaction platform comprises a decentralized network integration system that enables the platform to leverage one or more blockchain networks and/or one or more distributed storage networks in connection with facilitating legal transactions on the platform. Amongst other things, the decentralized network integration system can enable the legal transaction platform to utilize smart contract technologies, zero-knowledge proof (ZKP) technologies, and decentralized storage technologies to facilitate legal transactions securely while preserving the confidentiality of sensitive information. The integration of these technologies enhances both data integrity and transparency among the parties involved in the transactions.

In certain embodiments, the legal transaction platform can integrate ZKP functionalities with smart contract applications hosted on one or more blockchain networks to securely facilitate legal transactions while ensuring the confidentiality of sensitive information. By integrating ZKP functionalities with blockchain-based smart contracts, the platform permits parties to generate and/or provide zero-knowledge proofs that can be used to prove the validity of specific information (e.g., such as their identities, compliance with regulatory schemes, fulfillment of contractual terms, etc.) relating to the legal transactions without disclosing sensitive details. In some embodiments, the platform can operate as a trusted entity that registers verification keys corresponding to the zero-knowledge proofs with a smart contract application that is executed on a blockchain network. The smart contract application, or smart contracts initiated thereby, can include verification functions that are configured to verify or validate the authenticity of zero-knowledge proofs associated with the parties. This cryptographic approach significantly enhances data privacy and security, reducing the risk of data breaches and unauthorized access to sensitive information. Additionally, the smart contracts can automate the execution of transaction terms based on the ZKP verifications, ensuring that predefined conditions are met before actions are carried out while also protecting sensitive information. The integration of ZKP validation and smart contract processing allows the platform to provide a seamless and efficient transaction experience, enabling end-users to engage in legal transactions with confidence that their sensitive information is protected, while also benefiting from the transparency offered by the immutable and audited blockchains associated with the smart contracts.

In certain embodiments, to further enhance the security and protection in conducting transactions, the legal transaction platform also can store transaction documentation in one or more decentralized storage systems. These decentralized storage systems can distribute data across multiple nodes, eliminating single points of failure and significantly reducing the risk of data loss due to hardware malfunctions or cyberattacks. By segmenting and encrypting documents before distributing them across various nodes, the platform enables the transaction documentation to remain secure and accessible only to authorized parties. This approach not only enhances data integrity and redundancy but also provides a robust framework for maintaining confidentiality and compliance with legal standards.

Additionally, in some embodiments, the legal transaction platform can combine the usage of blockchain-hosted smart contracts with decentralized storage technologies to safeguard the integrity of transaction documentation corresponding to the legal transactions that are facilitated by the smart contracts. In some examples, the platform can generate document hashes for transaction documentation corresponding to the smart contracts, which serve as unique digital fingerprints ensuring the integrity and authenticity of the documents. These hashes can be appended to blocks associated with the smart contracts on the blockchain, providing a verifiable and immutable record of the documentation's existence and integrity. Additionally, the actual documentation can be securely stored across the nodes of the decentralized storage network, ensuring that the data is both protected from unauthorized access and redundantly available, thereby enhancing the overall security and reliability of the transaction documentation generated in connection with the legal transaction process.

In certain embodiments, the legal transaction platform also can include an AI-enabled dispute resolution system that can automate the resolution of disputes that may arise between or among client end-users and legal professional end-users. The AI-enabled dispute resolution system applies one or more pre-trained language models to analyze disputes arising from ongoing and/or previous legal transactions conducted on the platform. In some examples, a language model associated with the system can execute semantic understanding and/or other natural language processing (NLP) tasks on transaction documentation, such as smart contracts, agreements, and/or communications associated with the legal transaction under dispute, to derive an understanding of the transaction and/or nature of the dispute. The language model also can execute generative NLP tasks to generate and present proposals to the parties for resolving the dispute.

In certain embodiments, the legal transaction platform can combine the usage of LLM or deep learning technologies with blockchain-hosted smart contract technologies in connection with automating the resolution of disputes. For example, in addition to leveraging LLM technologies to drive resolutions among parties to a dispute, these technologies also can be applied to automatically update smart contracts stored on a blockchain network based on the outcome of the AI-enabled dispute resolution process. In scenarios where agreements are reached and/or resolution proposals are accepted by the parties, a language model can facilitate the implementation of agreed-upon solutions by updating smart contracts on the blockchain. Conversely, in scenarios where agreements are not reached and/or resolution proposals are not accepted by the parties, the language model can update the smart contract to reflect that the dispute was not resolved and/or to indicate that the dispute has been taken off the platform.

In certain embodiments, the legal transaction platform can incorporate a tokenized legal ecosystem that utilizes blockchain technology to facilitate secure and efficient transactions between client end-users and legal professional end-users. This ecosystem can employ tokens as the primary medium of exchange. Amongst other things, the tokens can enable client end-users to secure legal services rendered by legal professional end-users. In some scenarios, smart contracts can automate the exchange of tokens within the ecosystem, ensuring that predefined conditions are met before tokens are exchanged, thereby enhancing trust and reducing the potential for disputes. All token transactions can be recorded on one or more distributed ledgers of a blockchain network in an immutable audit trail to ensure that every exchange is permanently documented, providing transparency and accountability for all parties on the legal transaction platform. The tokenized legal ecosystem can also include a decentralized autonomous organization (DAO) that manages a token pool and oversees governance decisions, allowing token-holding end-users to vote on proposals related to platform policies and enhancements.

The embodiments described in this disclosure can be combined in various ways. Any aspect or feature that is described for one embodiment can be incorporated into any other embodiment mentioned in this disclosure. Moreover, any of the embodiments described herein may be hardware-based, may be software-based, or, preferably, may comprise a mixture of both hardware and software elements. Thus, while the description herein may describe certain embodiments, features, or components as being implemented in software or hardware, it should be recognized that any embodiment, feature, and/or component referenced in this disclosure can be implemented in hardware and/or software.

Exemplary System Architectures & Platform Configurations

Figure 1B:
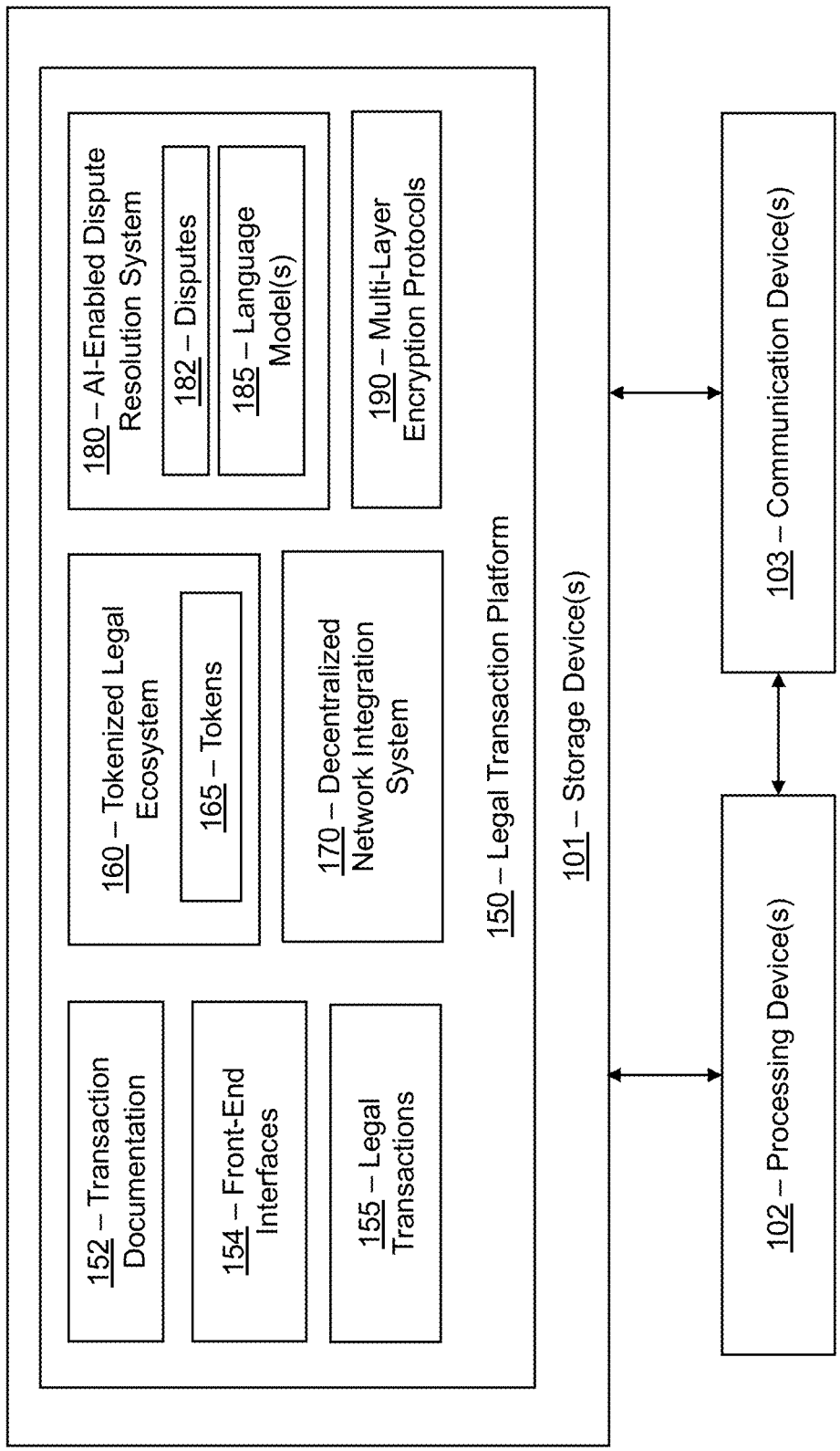
FIG. 1B is a block diagram demonstrating exemplary features of a legal transaction platform in accordance with certain embodiments.

FIG. 1A is a diagram of an exemplary system 100 in accordance with certain embodiments. FIG. 1B is a diagram illustrating exemplary components, features, and/or functions associated with a legal transaction platform 150 according to certain embodiments. FIGS. 1A and 1B are discussed jointly below.

The system 100 comprises one or more computing devices 110 and one or more servers 120 that are in communication over a communication network 115. A legal transaction platform 150 is stored on, and executed by, the one or more servers 120. The communication network 115 may represent any type of communication framework or network, e.g., such as one that comprises a local area network (e.g., a Wi-Fi network), a personal area network (e.g., a Bluetooth network), a wide area network, an intranet, the Internet, a cellular network, a television network, a satellite communication network, and/or other types of networks.

The legal transaction platform 150, the one or more servers 120, and/or the one or more computing devices 110 also may communicate with the one or more blockchain networks 130. Each blockchain network 130 may include a distributed and/or decentralized system of nodes that are in communication with each other. The nodes may correspond to computing devices 110, servers 120, specialized mining devices (e.g., ASIC-based miners), and/or other types of electronic devices that include processing and/or storage capabilities. Each blockchain network 130 may store one or more distributed ledgers according to a decentralized infrastructure or protocol. The one or more distributed ledgers may be stored across the nodes of the blockchain network 130 and the nodes can be configured to execute functions associated with validating and processing transactions on the blockchain network 130, recording transactions (including, but not limited to, the legal transactions 155 described herein) on the one or more distributed ledgers, maintaining consensus across the blockchain network 130, executing dApps or decentralized applications (including, but not limited to, the decentralized smart contract applications and/or decentralized storage applications described herein), managing network security, facilitating peer-to-peer communications, and/or other related functions.

In some embodiments, the one or more blockchain networks 130 may include the Solana blockchain network. Additionally, or alternatively, the one or more blockchain networks 130 may include the Ethereum blockchain network. Additionally, or alternatively, the one or more blockchain networks 130 include a private or proprietary network, tailored to specific needs or technical requirements of the platform.

The legal transaction platform 150, the one or more servers 120, and/or the one or more computing devices 110 also may communicate with the one or more distributed storage networks 140 (also referred to herein as decentralized storage networks 140). Each distributed storage network 140 may comprise a distributed or decentralized system of nodes that are in communication with each other. These nodes may correspond to computing devices 110, servers 120, and/or other types of electronic devices equipped with processing and storage capabilities. The distributed storage network 140 can be designed to store data across multiple nodes, ensuring redundancy and security, and the integrity of the stored data. The nodes within each distributed storage network 140 can execute functions associated with storing, retrieving, and managing data in a distributed manner. This can include segmenting data into smaller encrypted pieces, distributing these pieces across various nodes, and/or reconstructing the data when needed using cryptographic verification techniques. The decentralized nature of the storage network enhances data integrity and security by eliminating single points of failure and reducing the risk of unauthorized access.

In some embodiments, the one or more distributed storage networks 140 can be implemented independent of a blockchain network 130 and/or blockchain technology. The one or more distributed storage networks 140 may implement a peer-to-peer (P2P) protocol, such as IPFS (InterPlanetary File System) and/or other protocols, for decentralized file storage, sharing, and/or retrieval. In other embodiments, the one or more distributed storage networks 140 can be integrated with or utilize one or more blockchain networks 130. For example, the one or more decentralized storage networks 140 may include or communicate with a blockchain network 130 to leverage functionalities for data verification, data tracking, payment, and/or authentication.

All of the components illustrated in FIG. 1A, including the computing devices 110, servers 120, blockchain networks 130, distributed storage networks 140, and/or legal transaction platform 150 can be configured to communicate directly with each other and/or over the communication network 115 via wired or wireless communication links, or a combination of the two. Each of the computing devices 110, servers 120, legal transaction platform 150, and/or network nodes (including any nodes associated with the blockchain networks 130 and/or distributed storage networks 140) can include one or more storage devices 101, one or more processing devices 102, and/or one or more communication devices 103.

The one or more storage devices 101 may include (i) non-volatile memory, such as, for example, read only memory (ROM) and/or (ii) volatile memory, such as, for example, random access memory (RAM). The non-volatile memory may be removable and/or non-removable non-volatile memory. RAM may include dynamic RAM (DRAM), static RAM (SRAM), etc. Further, ROM may include mask-programmed ROM, programmable ROM (PROM), one-time programmable ROM (OTP), erasable programmable read-only memory (EPROM), electrically erasable programmable ROM (EEPROM) (e.g., electrically alterable ROM (EAROM) and/or flash memory), etc. In certain embodiments, the one or more storage devices 101 include physical, non-transitory mediums. The one or more computer storage devices 101 can store instructions for implementing any of the functionalities associated with the legal transaction platform 150.

The one or more processing devices 102 may include one or more central processing units (CPUs), one or more microprocessors, one or more microcontrollers, one or more controllers, one or more complex instruction set computing (CISC) microprocessors, one or more reduced instruction set computing (RISC) microprocessors, one or more very long instruction word (VLIW) microprocessors, one or more graphics processor units (GPU), one or more digital signal processors, one or more application specific integrated circuits (ASICs), and/or any other type of processor or processing circuit capable of performing desired functions. The one or more processing devices 102 can be configured to execute any computer program instructions that are stored or included on the one or more storage devices 101 including, but not limited to, instructions associated with executing the functionalities of the legal transaction platform 150.

Each of the one or more communication devices 103 can include wired and wireless communication devices and/or interfaces that enable communications using wired and/or wireless communication techniques. Wired and/or wireless communication can be implemented using any one or combination of wired and/or wireless communication network topologies (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), powerline network protocol(s), etc.). Exemplary PAN protocol(s) can comprise Bluetooth, Zigbee, Wireless Universal Serial Bus (USB), Z-Wave, etc. Exemplary LAN and/or WAN protocol(s) can comprise Institute of Electrical and Electronic Engineers (IEEE) 802.3 (also known as Ethernet), IEEE 802.11 (also known as Wi-Fi), etc. Exemplary wireless cellular network protocol(s) can comprise Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, etc. The specific communication software and/or hardware can depend on the network topologies and/or protocols implemented. In certain embodiments, exemplary communication hardware can comprise wired communication hardware including, but not limited to, one or more data buses, one or more universal serial buses (USBs), one or more networking cables (e.g., one or more coaxial cables, optical fiber cables, twisted pair cables, and/or other cables). Further exemplary communication hardware can comprise wireless communication hardware including, for example, one or more radio transceivers, one or more infrared transceivers, etc. Additional exemplary communication hardware can comprise one or more networking components (e.g., modulator-demodulator components, gateway components, etc.). In certain embodiments, the one or more communication devices can include one or more transceiver devices, each of which includes a transmitter and a receiver for communicating wirelessly. The one or more communication devices 103 also can include one or more wired ports (e.g., Ethernet ports, USB ports, auxiliary ports, etc.) and related cables and wires (e.g., Ethernet cables, USB cables, auxiliary wires, etc.).

In certain embodiments, the one or more communication devices 103 additionally, or alternatively, can include one or more modem devices, one or more router devices, one or more access points, and/or one or more mobile hot spots. For example, modem devices may enable the computing devices 110, server(s) 120, and/or legal transaction platform 150 to be connected to the Internet and/or other network. The modem devices can permit bi-directional communication between the Internet (and/or other network) and the computing devices 110, server(s) 120, and/or legal transaction platform 150. In certain embodiments, one or more router devices and/or access points may enable the computing devices 110, server(s) 120, blockchain network devices, and/or legal transaction platform 150 to be connected to a LAN and/or other more other networks. In certain embodiments, one or more mobile hot spots may be configured to establish a LAN (e.g., a Wi-Fi network) that is linked to another network (e.g., a cellular network). The mobile hot spot may enable the computing devices 110, server(s) 120, and/or legal transaction platform 150 to access the Internet and/or other networks.

In certain embodiments, the computing devices 110 may represent desktop computers, laptop computers, mobile devices (e.g., smart phones, personal digital assistants, tablet devices, vehicular computing devices, wearable devices, or any other device that is mobile in nature), gaming consoles and/or other types of devices. The one or more servers 120 may generally represent any type of computing device, including any of the computing devices 110 mentioned above. The one or more servers 120 also can comprise one or more mainframe computing devices, one or more virtual servers, one or more application servers, and/or one or more cloud-based servers. In some embodiments, the one or more servers 120 can be configured to execute web servers and can communicate with the computing devices 110 and/or other devices over the network 115 (e.g., over the Internet).

As mentioned above, some or all of the computing devices 110 may represent mobile electronic devices in certain embodiments. Generally speaking, the mobile electronic devices can include any type of electronic device that is portable and/or transportable in nature. In some cases, a mobile electronic device can refer to a portable electronic device (e.g., an electronic device easily conveyable by hand by a person of average size) with the capability to present audio and/or visual data (e.g., text, images, videos, music, etc.). For example, a mobile electronic device can comprise at least one of a cellular telephone (e.g., a smartphone), a personal digital assistant, a handheld digital computer device (e.g., a tablet personal computer device), a digital media player, a wearable device, and/or another portable computer device with the capability to present audio and/or visual data (e.g., images, videos, music, etc.). Thus, in many examples, a mobile electronic device can comprise a volume and/or weight sufficiently small as to permit the mobile electronic device to be easily conveyable by hand. For examples, in some embodiments, a mobile electronic device can occupy a volume of less than or equal to approximately 1790 cubic centimeters, 2434 cubic centimeters, 2876 cubic centimeters, 4056 cubic centimeters, and/or 5752 cubic centimeters. Further, in these embodiments, a mobile electronic device can weigh less than or equal to 15.6 Newtons, 17.8 Newtons, 22.3 Newtons, 31.2 Newtons, and/or 44.5 Newtons.

Exemplary mobile electronic devices can comprise (i) an iPod®, iPhone®, iTouch®, iPad®, and/or similar products offered by Apple Inc. of Cupertino, California, United States of America; (ii) a Blackberry® or similar product by Research in Motion (RIM) of Waterloo, Ontario, Canada; (iii) a Lumia® or similar product by the Nokia Corporation of Keilaniemi, Espoo, Finland, and/or (iv) a Galaxy® or similar product by the Samsung Group of Samsung Town, Seoul, South Korea. Further, in the same or different embodiments, a mobile electronic device can comprise an electronic device configured to implement one or more of (i) the iOS® or iPhone® operating system by Apple Inc. of Cupertino, California, United States of America, (ii) the Blackberry® operating system by Research In Motion (RIM) of Waterloo, Ontario, Canada, (iii) the Palm® operating system by Palm, Inc. of Sunnyvale, California, United States, (iv) the Android® operating system developed by the Open Handset Alliance, (v) the Windows Mobile™ operating system by Microsoft Corp. of Redmond, Washington, United States of America, or (vi) the Symbian™ operating system by Nokia Corp. of Keilaniemi, Espoo, Finland.

The mobile electronic devices can additionally, or alternatively, include wearable devices (e.g., wearable user computer devices) as mentioned above. Generally speaking, wearable devices can generally include any type of electronic device that is capable of being mounted to, worn by, and/or fixed to an individual. For example, in some cases, the wearable devices sometimes can be worn under or over clothing, and/or integrated with the clothing and/or other accessories (e.g., hats, eyeglasses, wristbands, watches, shoes, gloves, etc.). In some cases, wearable devices can be directly mounted or attached to individuals (e.g., the individuals' head, wrist, arms, legs, or neck regions). The wearable devices can comprise a head-mountable wearable user computer device (e.g., one or more head-mountable displays, one or more eyeglasses, one or more contact lenses, one or more retinal displays, etc.) and/or a limb-mountable wearable user computer device (e.g., a smartwatch). In some configurations, the wearable devices can be configured to present audio and/or visual data (e.g., text, images, videos, audio, music, etc.) and/or to receive inputs from individuals (e.g., via one or more input devices such as touchscreens, switches, buttons, etc.). The mobile electronic devices can include additional types of devices other than those explicitly mentioned herein.

In certain embodiments, the legal transaction platform 150 can be stored on, and executed by, the one or more servers 120. Additionally, or alternatively, the legal transaction platform 150 can be stored on, and executed by, the one or more computing devices 110. Thus, in some embodiments, the legal transaction platform 150 can be stored as one or more server applications running on one or more servers 120 and, in other embodiments, can be stored as a local application running on a computing device 110, or integrated with a local application stored on a computing device 110.

Additionally, in some embodiments, the legal transaction platform 150 can be implemented as a combination of a front-end application (e.g., which includes a mobile app, native application, and/or web browser stored on a computing device 110) and a back-end application (e.g., which is stored on one or more servers 120). All functionalities of the legal transaction platform 150 described herein can be executed by the front-end application, the back-end application, or a combination of both.

In some exemplary configurations, end-users 105 may utilize the computing devices 110 to access the legal transaction platform 150 over the communication network 115, and the legal transaction platform 150 may enable the end-users 105 to conduct legal transactions 155 via the platform. In facilitating the legal transactions 155, the legal transaction platform 150 can leverage various functionalities enabled by one or more blockchain networks 130. In some examples, the legal transaction platform 150 may communicate with one or more blockchain networks 130 to authenticate end-users 105 (e.g., using ZKP proofing and/or other techniques), implement smart contracts (e.g., including establishing smart contracts and verifying their conditions), facilitate the exchange of tokens and/or cryptocurrencies, and/or other functionalities described throughout this disclosure. Additionally, the legal transaction platform 150 can leverage functionalities of the one or more distributed storage networks 140 to securely store transaction documentation 152 corresponding to the legal transactions 155 and/or any other data that is generated or associated with the legal transaction platform 150.

In some embodiments, the legal transaction platform 150 provides one or more front-end interfaces 154, which enable the end-users 105 to access and utilize the various functionalities of the legal transaction platform 150 described throughout this disclosure. The front-end interfaces 154 may comprise graphical user interfaces (GUIs) and/or other types of interfaces that can be accessed by the computing devices 110 operated by end-users 105. In some examples, the front-end interfaces 154 may be presented via mobile apps, local applications, and/or web browser applications installed on the computing devices 110. Amongst other things, the front-end interfaces 154 may enable the end-users 105 to log in and access user accounts maintained by the legal transaction platform 150.

In some embodiments, the legal transaction platform 150 functions as an intermediary or middle layer positioned between end-users 105 and the blockchain networks 130 (and positioned between the end-users 105 and the decentralized storage networks 140). This network layout or configuration allows the legal transaction platform 150 to seamlessly leverage blockchain and/or distributed storage functionalities without burdening end-users 105 with the technical complexities often associated with the usage of blockchain technologies (e.g., such as wallet setup, security key management, network connectivity, etc.) and distributed storage technologies (e.g., P2P networking, encryption protocols, etc.), while providing the end-users 105 benefits such as enhanced data confidentiality in conducting legal transactions 155, secure authentication of end-users, verifiable and immutable audit trails relating to legal transactions, secure storage of transaction documentation 152 in distributed environments, automated consensus-based verification, and/or other advantages detailed in this disclosure.

In some examples described throughout this disclosure, the legal transaction platform 150 can be integrated into a networking site or platform that connects client end-users and legal professional end-users. For example, the legal transaction platform 150 may provide functions that enable client end-users to view, select, and/or hire legal professional end-users and/or that enable legal professional end-users to search for work or job postings created by client end-users.

However, the technologies described herein have broader applicability and can generally be applied to securely facilitate legal transactions 155 and/or protect transaction documentation 152 in any context. For instance, in other exemplary embodiments, the technologies described herein can be integrated into an electronic system or IT infrastructure utilized by law firms, accounting firms, real estate title companies, consultant companies, and/or other types of businesses to securely facilitate transactions and/or protect transaction documentation for the firm's clients. The technologies can be applied in other contexts and environments as well.

In some examples described herein, the one or more computing devices 110 can execute a mobile app or web browser that enables end-users 105 to access the legal transaction platform 150 over the network 115 (e.g., over the Internet). The legal transaction platform 150 can provide a framework that connects and facilitates communications among end-users 105 and enables the end-users 105 to conduct legal transactions 155 via the platform. The legal transaction platform 150 can leverage various blockchain-based functionalities to facilitate the legal transactions 155 in a secure and transparent manner.

In some exemplary use cases described herein, a first subset of end-users 105 may correspond to client end-users seeking to obtain legal services and a second subset of end-users 105 may correspond to legal professional end-users (e.g., such as attorneys, lawyers, paralegals, law firms, etc.) that offer legal services. The legal transaction platform 150 may enable both sets of end-users to establish profiles and can provide various functionalities to each user type. For example, the legal transaction platform 150 can provide client end-users with functionalities including, inter alia, functionalities that enable the users to search for legal professional end-users registered with the platform, submit job postings or request for proposals (RFPs), select or hire legal professional end-users to conduct legal transactions 155, establish smart contracts with legal professional end-users in connection with the legal transactions 155, monitor statuses of established smart contracts, etc. Along similar lines, the legal transaction platform 150 can provide legal professional end-users with functionalities including, inter alia, functionalities that enable searching client end-user profiles, accessing or reviewing job postings or RFPs submitted by client end-users, establishing smart contracts with client end-users in connection with the legal transactions 155, monitoring statuses of established smart contracts, etc.

The legal transaction platform 150 can facilitate various types of legal transactions 155. In some examples, the legal transactions 155 can correspond to interactions that involve establishing an attorney-client relationship, preparing and executing various types of legal documents, conducting attorney consultations, and/or representing clients in connection with court, arbitration, and/or mediation proceedings. Other types of legal transactions 155 also are possible.

The legal transactions 155 facilitated via the legal transaction platform 150 can generally correspond to any legal practice area, including, but not limited to, practice areas encompassing contract law, real estate law, litigation, intellectual property law (including patent, trademark, copyright, and/or trade secret laws), family law, criminal law, corporate law, tax law, environmental law, labor and employment law, immigration law, bankruptcy law, health law, entertainment law, and international law.

In one example, the legal transaction platform 150 can facilitate legal transactions 155 that involve drafting, reviewing, editing, and/or negotiating contracts. In another example, the legal transaction platform 150 can facilitate legal transactions 155 that involve real estate or property purchases, sales, and/or leases. In another example, the legal transaction platform 150 can facilitate legal transactions 155 that involve preparing, filing, and/or prosecuting patent applications, trademark applications, and/or copyright applications. In another example, the legal transaction platform 150 can facilitate legal transactions 155 that involve representing clients in civil litigations. In another example, the legal transaction platform 150 can facilitate legal transactions 155 that involve representing or defending clients in criminal proceedings. In another example, the legal transaction platform 150 can facilitate legal transactions 155 that involve preparing legal opinions.

In further examples, the legal transactions associated with the title companies. The techniques described herein enable end-users seeking title services to enter into smart contracts with legal professional end-users (e.g., title companies or individuals that perform title services). Using the techniques set forth in this disclosure, a smart contract may enable an end-user may be used to obtain a title search, secure title insurance, place amounts in escrow, obtain closing services, and/or obtain deed recording services.

In facilitating the legal transactions 155 via the legal transaction platform 150, a decentralized network integration system 170 can communicate with the one or more blockchain networks 130 to enforce enhanced security and privacy protocols in connection with the legal transactions 155. Additionally, the decentralized network integration system 170 can communicate with one or more distributed storage networks 140 to store transaction documentation 152 and/or other data related to the legal transactions 155. The decentralized network integration system 170 incorporates software code or programming logic that allows the legal transaction platform 150 to utilize blockchain technologies and/or distributed storage technologies for various purposes in facilitating legal transactions 155.

In some examples, the decentralized network integration system 170 can enable the client end-users and legal professional end-users to establish smart contracts to govern their relationship with each other and/or the legal transactions 155 conducted via the legal transaction platform 150. The smart contracts may correspond to self-executing contracts that are executed on the one or more blockchain networks 130, and which automatically execute certain actions when certain predefined criteria corresponding to the legal transactions 155 are satisfied.

This smart contract-enabled automation eliminates the need for intermediaries, streamlining the process, efforts, and time for the legal transactions 155. The transparency of smart contracts ensures that all terms and conditions are visible and/or verifiable on the blockchain, fostering trust and reducing disputes between parties. Additionally, the security provided by the immutable nature of blockchain technology minimizes the risk of fraud and manipulation, ensuring that once a contract is deployed, it cannot be altered. This enhances the integrity of legal transactions 155 on the platform. Furthermore, the efficiency gained from eliminating manual processing allows for quicker resolution of legal matters, benefiting both clients and legal professionals by reducing administrative burdens and costs.

In further examples, the decentralized network integration system 170 can enable the client end-users and legal professional end-users to leverage blockchain-based zero-knowledge proof (ZKP) functionalities in facilitating the legal transactions 155 and/or other functionalities accessible via the legal transaction platform 150. These ZKP functionalities utilize cryptographic protocols that allow a party (e.g., a client end-user or legal professional end-user) to demonstrate the validity of specific information to the other party without disclosing the actual information itself. In certain embodiments, the decentralized network integration system 170 enables the end-users to leverage ZKP functionalities in connection with authenticating parties to smart contracts and/or authenticating access to end-user accounts on the legal transaction platform 150. Integrating ZKP functionalities into the legal transaction platform 150 can enhance data privacy and security in connection with electronically conducting legal transactions 155 via the system, and enables sensitive data pertaining to the legal transactions 155 to be kept confidential. This is particularly beneficial in the legal domain, where confidentiality, data privacy, and security are of utmost importance.

In facilitating the legal transactions 155 via the legal transaction platform 150, various types of transaction documentation 152 may be exchanged between client end-users and legal professional end-users via the platform. In some examples, when a client end-user initially engages the services of a legal professional end-user, certain types of transaction documentation 152 (e.g., engagement letters, non-disclosure agreements, retainer agreements, RFPs, scope of work summaries, etc.) may be exchanged between the parties for establishing the relationship between the parties and/or the scope of work to be performed by the legal professional end-users. Throughout the course of a legal transaction 155, various types of transaction documentation 152 related to the desired legal services also may be exchanged (e.g., such as electronic documents or files corresponding to contracts, real estate agreements, legal briefs, court documents, patent applications, trademark applications, invoices, arbitration documents, etc.). The transaction documentation 152 also may reflect communications exchanged between a client end-user and a legal professional end-user (e.g., such as text, audio, and/or video communications exchanged between the parties) via communication functions provided via the legal transaction platform 150 (e.g., via inbox messages, instant messaging functions, and/or videoconferencing functions provided via the platform 150).

Some or all of the transaction documentation 152 can be stored by the legal transaction platform 150 (e.g., in one or more databases maintained or accessed by the legal transaction platform 150). In certain embodiments, the legal transaction platform 150 may include, utilize, and/or communicate with a distributed storage network 140 to store the transaction documentation 152.

In certain embodiments, the decentralized network integration system 170 of the legal transaction platform 150 may store software code or logic for communicating with one or more distributed storage networks 140 in connection with facilitating the distributed storage of the transaction documentation 152 and/or retrieving or accessing transaction documentation 152 previously stored in the distributed storage networks 140.

In certain embodiments, the distributed storage network 140 may be configured to store the transaction documentation 152 across a distributed network of blockchain nodes (rather than, or in addition to, storing the data on centralized servers). In accordance with certain decentralized storage protocols, the transaction documentation 152 may be split into smaller, encrypted pieces and distributed across multiple nodes. Additionally, when the transaction documentation 152 is needed or desired, the transaction documentation 152 may be reconstructed (e.g., using cryptographic verification techniques).

The decentralized storage of transaction documentation 152 by the legal transaction platform 150 offers several notable benefits. By distributing encrypted data across multiple nodes, the system ensures that transaction documentation 152 is not subject to fraud, tampering, or other malicious activities, and it ensures the integrity of the transaction documentation 152. Additionally, the decentralized storage of documents provides redundancy benefits, as copies of the data can be stored in various locations, preventing data loss. Moreover, this approach can enhance security by spreading encrypted data across multiple sites, making unauthorized access more difficult. Furthermore, the decentralized nature of the storage system provides fault tolerance, eliminating a single point of failure that may be present in traditional cloud storage solutions. These benefits collectively enhance the robustness and security of the legal transaction platform 150, ensuring that transaction documentation 152 is securely stored and readily accessible when needed, and ensuring that the transaction documentation 152 is not subject to fraud or tampering.

In certain embodiments, the legal transaction platform 150 also can store and implement multi-layer encryption protocols 190 to further bolster the security of legal transactions 155 conducted via the platform. In certain embodiments, the multi-layer encryption protocols 190 can implement multiple layers of encryption to protect data at different stages, including during transmission, storage, and processing. For instance, a first layer may encrypt data while it is being transmitted (e.g., exchanged between clients and lawyers and/or exchanged between the platform and end-users), such as during lawyer-client communications, using protocols such as TLS (transport layer security). A second layer may focus on encrypting data stored on servers or databases, in some examples, employing robust algorithms like AES-256 (advanced encryption standard 256) to ensure data remains secure. A third layer may encrypt data while it is being processed or accessed, providing an additional level of security to protect sensitive information from unauthorized access. In some embodiments, each layer may apply a different encryption protocol to ensure robust and comprehensive protection.

In addition to these layers, the multi-layer encryption protocols 190 extend to data stored on the blockchain or in distributed systems, utilizing cryptographic techniques specific to blockchain and/or decentralized storage technologies. In embodiments that use a decentralized storage system, encryption can be applied by segmenting documents into smaller pieces, encrypting those pieces, and distributing them across various nodes. This approach not only enhances data security but also ensures redundancy and integrity by eliminating single points of failure. Furthermore, on-chain encryption can include the use of ZKP cryptographic techniques to validate or verify the legitimacy of information without exposing transaction details, as well as storing document hashes on the blockchain for verification purposes. Overall, these multi-layered encryption protocols 190 provide a robust framework for protecting sensitive legal data, ensuring confidentiality, and maintaining the integrity of information within the legal transaction platform.

In certain embodiments, the legal transaction platform 150 can include a tokenized legal ecosystem 160 that, inter alia, facilitates the exchange of tokens 165 between client end-users and legal professional end-users for various purposes. The tokens 165 may represent digital assets that represent a unit of value and/or utility within the blockchain-based ecosystem 160. Amongst other things, the tokens 165 can be used as a medium of exchange, similar to currency, to facilitate the legal transactions 155 between parties on the platform.

In some examples, the tokenized legal ecosystem 160 may enable client end-users to purchase tokens 165 via the legal transaction platform 150, to earn tokens 165 via loyalty programs, and/or to acquire tokens 165 by other means. Additionally, the tokenized legal ecosystem 160 may enable client end-users to utilize the tokens 165 to purchase services from legal professional end-users (e.g., using the smart contracts described herein), such as consultations, legal documentation, and/or court representation. The tokens 165 may serve as the primary medium of exchange within the tokenized legal ecosystem 160 and can be utilized for other purposes as well.

In certain embodiments, the ownership and/or transfer of tokens 165 can be tracked using a blockchain network 130 (e.g., by appending blocks to the blockchain ledger each time tokens 165 are exchanged or transferred). The decentralized network integration system 170 of the legal transaction platform may store code and/or computing logic for communicating with the blockchain network 130 to facilitate token transfers or exchanges and/or to update token ownership.

In some embodiments, the smart contracts described in this disclosure can be utilized to control the exchange of tokens 165 between client end-users and legal professional end-users. The smart contracts may permit client end-users to pay for legal services and/or corresponding legal transactions 155 using the tokens 165. For example, in scenarios where the legal services are rendered without any dispute between a client-end user and a legal professional end-user who is providing legal services to the client end-user, the smart contract can be used to transfer the client end-user's tokens 165 to a legal professional user for payment based on the smart contract determining that one or more conditions have been satisfied. Conversely, if there is a dispute between the parties, some or all of the tokens 165 for a corresponding legal transaction 155 can be held in escrow pending a resolution to the dispute (e.g., in some cases, pending an outcome of the artificial intelligence-ended (or AI-enabled) dispute resolution system 180 described in this disclosure).

In some embodiments, a portion of the tokens 165 involved with each smart contract and/or each legal transaction 155 can be allocated to the legal transaction platform 150 to fund platform maintenance and/or improvements (e.g., to enhance security, develop technologies and functionalities, etc.).

The legal transaction platform 150 also may store and execute an AI-enabled dispute resolution system 180 to help resolve disputes 182 with may arise on the platform. For example, in the event that a dispute 182 arises between a client end-user and a legal professional end-user in connection with a legal transaction 155 and/or corresponding smart contract, the AI-enabled dispute resolution system 180 can be activated and/or utilized to help drive a resolution to the dispute 182.

As explained in further detail below, the AI-enabled dispute resolution system 180 can include, or communicate with, one or more language models 185 to analyze various types of information related to a legal transaction 155 that is being disputed. In some examples, the AI-enabled dispute resolution system 180 can access details of a smart contract data stored on the blockchain which pertains to the disputed legal transaction 155, transaction documentation 152 related to the disputed legal transaction 155, communications between a client end-user and a legal professional end-user associated with the disputed legal transaction 155, and/or other information to gain an understanding of the legal transaction 155 and/or the nature of the dispute 182.

Additionally, the AI-enabled dispute resolution system 180 may utilize its understanding of the legal transaction 155 and/or dispute 182 to generate and present one or more resolution proposals to the parties involved in the dispute 182. In some examples, the resolution proposals may involve changing the terms of the smart contract (e.g., token amounts, deadlines, etc.) and/or compensating one of the parties involved in the dispute 182 (e.g., by allocating tokens 165 to that party). If the parties to the dispute 182 accept one of the AI-generated resolution proposals, then the AI-enabled dispute resolution system 180 may automatically implement the accepted proposal (e.g., by communicating a blockchain network 130 to allocate tokens 165 and/or to update smart contract terms). Additionally, the AI-enabled dispute resolution system 180 may update the smart contract on the blockchain to reflect the details of the dispute 182 and/or accepted resolution proposal and/or to incorporate a document hash onto the blockchain which identifies a stored document that comprises such details. Conversely, if no agreement is reached, the dispute 182 may be taken off of the legal transaction platform 150 and the AI-enabled dispute resolution system 180 may update the smart contract on the blockchain to reflect the details of the dispute and/or indicate that the dispute 182 is being resolved off of the legal transaction platform 150.

The technologies described herein can be applied in many different contexts or environments other than, or in addition to, those which involve conducting legal transactions 155 and/or establishing connections between clients and legal professional end-users. In some exemplary use cases, the technologies can be applied to conduct transactions in other contexts and/or for other types of services. In one example, the technologies can be applied to conduct transactions between client end-users and professional end-users corresponding to accountants. In another example, the technologies can be applied to conduct transactions between client or customer end-users and technical end-users corresponding to software developers, IT specialists, or the like. In one example, the technologies can be applied to conduct transactions between client end-users corresponding to patients and professional end-users corresponding to healthcare providers (e.g., doctors or medical practitioners). In another example, the technologies can be applied to conduct transactions between client or customer end-users and professional end-users corresponding to real estate agents, architects, or the like. Thus, any exemplary embodiment mentioned in this disclosure that are described as applying to a legal transaction (or involving client end-users and legal professional end-users) also can be applied to conduct other types of transactions (and can more broadly apply to end-users seeking services and end-users who provide services).

The components illustrated in FIG. 1B can be combined or integrated in various ways to implement the functionalities described herein. For example, while the components may be described as being distinct components in some instances, it should be understood that the functionalities of the components can be combined or integrated in any manner whatsoever and the labels assigned to these components are merely to facilitate understanding of the techniques and functions described herein.

The system configurations described herein are provided as examples to demonstrate environments in which embodiments described herein can be deployed. Numerous modifications and variations to the disclosed embodiments are possible, and the techniques described herein can be implemented in many other contexts and environments.

Exemplary Decentralized Integration Solutions

The following discussion describes examples demonstrating how the legal transaction platform 150 can leverage smart contract functionalities, ZKP functionalities, and/or distributed storage functionalities to securely and transparently facilitate legal transactions 155 via the legal transaction platform 150.

Figure 2:
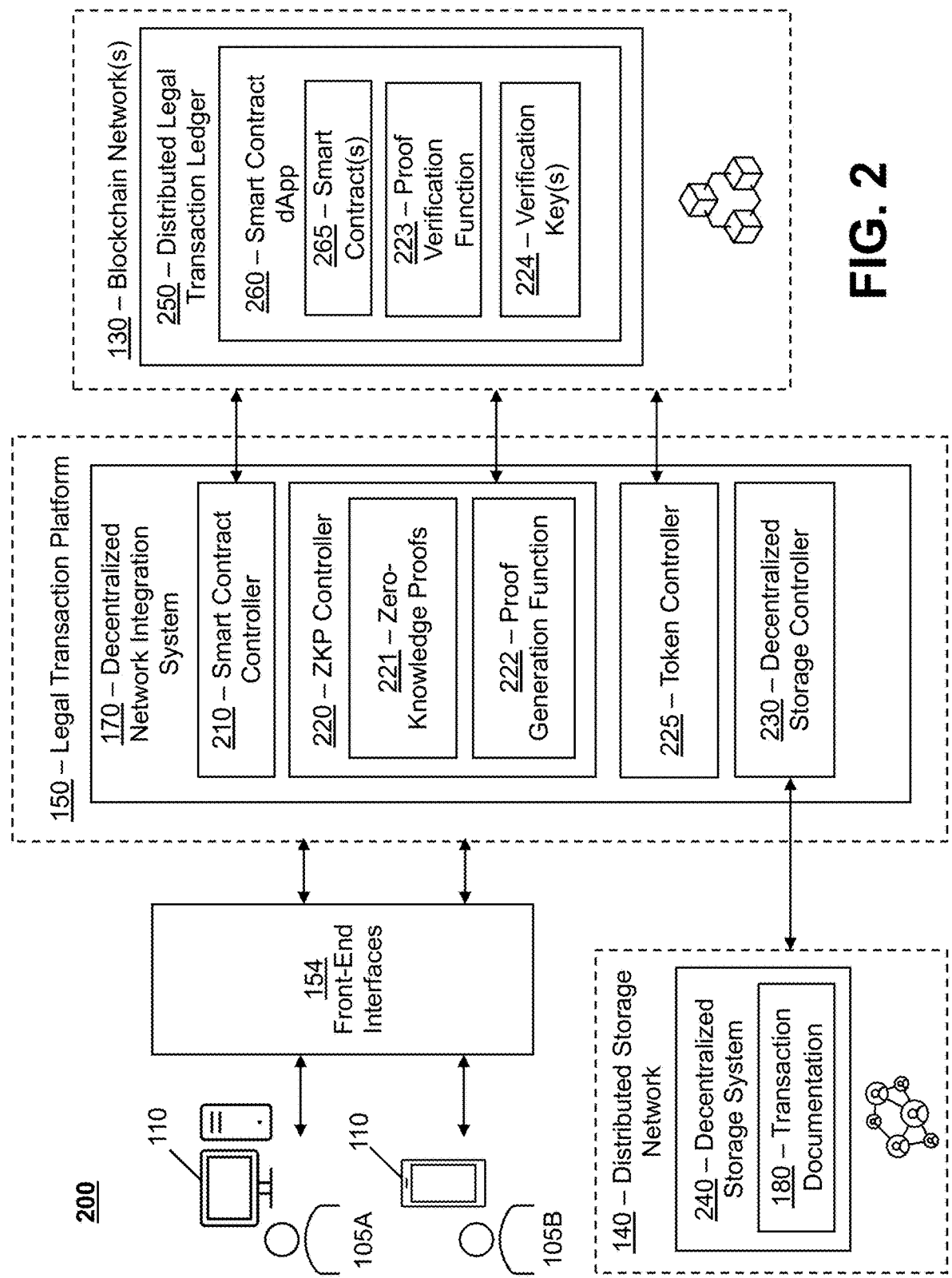
FIG. 2 is a block diagram illustrating an exemplary framework for integrating blockchain and decentralized storage technologies into a legal transaction platform in accordance with certain embodiments.

FIG. 2 is a block diagram illustrating an exemplary system architecture 200 for integrating blockchain and decentralized storage technologies into the legal transaction platform 150.

Client end-users 105A and professional end-users 105B can operate computing devices 110 to access various front-end interfaces 154 of the legal transaction platform 150. The front-end interfaces 154 enable the client end-users 105A and professional end-users 105B to initiate and conduct legal transactions 155.

In conducting the legal transactions 155, the decentralized network integration system 170 of the legal transaction platform 150 may communicate with, and leverage the functionalities, of one or more blockchain networks 130 in a manner that is transparent to the end-users 105 and which avoids burdening the end-users 105 with the technical complexities associated using blockchain technologies (e.g., such as wallet setup, security key management, network connectivity, etc.). Additionally, the decentralized network integration system 170 of the legal transaction platform 150 may communicate with, and leverage the functionalities, of one or more distributed storage networks 140 to securely store various types of transaction documentation 152 corresponding to the legal transactions 155.

In some embodiments, the decentralized network integration system 170 may include a smart contract controller 210, a ZKP controller 220, a token controller 225, and/or a decentralized storage controller 230.

The smart contract controller 210 may include software and/or computing logic that enables the creation and/or management of smart contracts 265 on a blockchain network 130 (or multiple blockchain networks 130). The smart contract controller 210 may generally be configured to perform any or all of the functionalities described in this disclosure which relate to the ability of the legal transaction platform 150 to create, utilize, or leverage smart contracts 265.

In certain embodiments, the smart contract controller 210 can facilitate the creation, deployment, and execution of smart contracts 265 on the blockchain network 130, and/or ensure that all conditions and terms associated with the smart contracts 265 are satisfied prior to executing certain actions and/or updating statuses of the smart contracts 265. The smart contract controller 210 can incorporate code that automates the enforcement of contract terms, reducing the need for manual intervention and enhancing efficiency. Additionally, the smart contract controller 210 also can be configured to manage updates to the contract terms, and initiate or process transactions related to the smart contracts 265. By integrating blockchain technology, the smart contract controller 210 ensures that all legal transactions 155 conducted via the legal transaction platform 150 are transparent, secure, and immutable, thereby fostering trust and reliability in the legal transactions 155.

In some embodiments, the blockchain network 130 may correspond to the Solana blockchain, known for its high throughput and low transaction costs, making it suitable for applications that demand fast and efficient processing. Alternatively, or additionally, the blockchain network 130 may be based on Ethereum, which offers robust smart contract capabilities and a well-established ecosystem. In other scenarios, the blockchain network may be a private or proprietary network, tailored to specific organizational needs or technical requirements. The smart contract controller 210 can be configured to communicate these and/or other blockchain networks 130 to implement the functionalities described in this disclosure.

The blockchain network 130 stores a distributed legal transaction ledger 250 across the nodes of the network. The distributed legal transaction ledger 250 may correspond to a distributed ledger implementation that records, inter alia, blocks and/or data associated with legal transactions 155 conducted via the legal transaction platform 150, and/or smart contracts initiated via the legal transaction platform 150. The distributed legal transaction ledger 250 may employ a database architecture in which each block or data record is spread throughout and/or viewable by numerous entities on the network 130. This ledger 250 can provide a tamper-proof, auditable, and transparent framework for legal operations by timestamping every action, including those that involve document creation, sharing, and revocation, and cryptographically linking them.

In certain embodiments, the distributed legal transaction ledger 250 may applied to record any or all blockchain-based transactions described in this disclosure. In some examples, the distributed legal transaction ledger 250 can record transactions associated with exchanging tokens 165 and/or cryptocurrencies via the platform 150, validating zero-knowledge proofs, executing smart contracts 265, facilitating DAO-based voting mechanisms, and/or other functions described herein.

The blockchain network 130 also stores and executes a smart contract decentralized application 260 (or smart contract dApp 260) for implementing and/or managing the smart contracts 265 on the network 130. The smart contract controller 210 of the legal transaction platform 150 may communicate with the smart contract dApp 260 to initiate, create, manage, modify, and/or terminate the smart contracts 265. In some configurations, the smart contract dApp 260 may be stored on one or more blocks of the distributed legal transaction ledger 250 and the smart contract controller 210 may utilize the address of the one or more blocks to communicate with the smart contract dApp 260 in connection with initiating, creating, managing, modifying, updating, and/or terminating the smart contracts 265.

In some embodiments, the smart contracts 265 may comprise self-executing contracts with the terms of the agreement directly written into code. For example, the smart contracts 265 may automatically enforce and execute the agreed-upon terms when specific conditions are met, eliminating the need for intermediaries. Stored on a blockchain, smart contracts 265 help ensure transparency, security, and immutability for the legal transactions 155, as the details of the legal transactions 155 can be recorded on the decentralized legal transaction ledger 250. Additionally, as explained below, the smart contracts 265 can leverage ZKP functionalities to protect sensitive data for the legal transactions and ensure data confidentiality.

The smart contracts 265 initiated via the legal transaction platform 150 can facilitate a wide range of applications, from financial transactions to legal agreements, by automating processes and reducing the potential for disputes or fraud. In one example, smart contracts 265 can be established on the platform to establish attorney-client relationships between client end-users 105A and legal professional end-users 105B. In another example, smart contracts 265 can be established on the platform to govern or specify the parameters of projects and/or the scope of work to be performed in connection with the legal transactions 155.

In some specific examples, smart contracts 265 may be established for legal transactions 155 involving real estate transactions (e.g., buying, selling, or leasing properties), contract transactions, intellectual property transactions (e.g., filing or prosecuting applications for patents, trademarks, and/or copyrights), financial service transactions (e.g., loan agreements, insurance claims, or investment management), title company transactions, and/or employment agreement transactions. In further examples, smart contracts 265 may be established for legal transactions 155 involving litigations, civil court proceedings, and/or criminal court proceedings.

The ZKP controller 220 can include software and/or programming logic configured to manage and execute zero-knowledge proof (ZKP) functionalities within the legal transaction platform. Amongst other things, it can facilitate the generation and verification of zero-knowledge proofs 221 that enable end-users 105 to demonstrate the validity of specific information without revealing the underlying data. Notably, the functionalities of the ZKP controller 220 can be integrated with the smart contracts 265 to enable the parties to the smart contracts 265 to securely prove various types of information, satisfy conditions associated with the smart contracts 265, and/or otherwise facilitate legal transactions 155. Instead of storing sensitive information directly on the blockchain related to smart contracts 265 or corresponding legal transactions 155—such as confidential details identifying PII for the parties, KYC/AML compliance data, or payment information—the blockchain (or distributed legal transaction ledger 250) can be updated with blocks or data that confirm whether parties have verified their information using ZKP functions. This enhances data privacy and security by ensuring that sensitive information remains confidential during legal transactions 155.

The ZKP controller 220 can be configured with various types of ZK cryptographic protocols to implement the functionalities described herein, including, but not limited to, zk-SNARKs Zero-Knowledge Succinct Non-Interactive Argument of Knowledge), zk-STARKs (Zero-Knowledge Scalable Transparent Argument of Knowledge), interactive zero-knowledge proofs, non-Interactive zero-knowledge (NIZK) proofs, PLONK (Permutations over Lagrange-bases for Oecumenical Noninteractive arguments of Knowledge), Bulletproofs, and/or other similar protocols. These protocols may include or utilize various types of proof generation functions 222, which can be utilized to generate the zero-knowledge proofs 221 described herein, and proof verification functions 223, which can be utilized to verify the zero-knowledge proofs 221. By leveraging these and/or other advanced cryptographic techniques, the ZKP controller 220 enables the platform 150 to maintain a high level of trust and integrity in connection with administering the legal transactions 155.

The zero-knowledge proofs 221 generated by the ZKP controller 220 can comprise mathematical constructs and/or cryptographic data that allow a party to demonstrate the validity of specific information without revealing the underlying data. In some examples, these proofs may include, or may be generated based on, a combination of private inputs (e.g., such as personal identifiers or transaction details) and public inputs (e.g., such as cryptographic hashes or registry data). The zero-knowledge proofs 221 can be utilized in connection with the smart contracts 265 for various purposes, e.g., such as to authenticate users, verify compliance with regulatory requirements, verify payments, etc. By using advanced cryptographic techniques (e.g., such as zk-SNARKs or zk-STARKs, or other techniques), the proofs facilitate secure and confidential verification processes, reducing the risk of data breaches and unauthorized access. They help protect sensitive information, even as the validity of the information is confirmed on the blockchain.

In some examples, the ZKP controller 220 and/or administrator of the legal transaction platform 150 may operate as a trusted authority that registers verification keys 224 corresponding to the zero-knowledge proofs 221 on the distributed legal transaction ledger 250 and/or in corresponding smart contracts 265 hosted on the blockchain network 130. These verification keys 224 may comprise cryptographic identifiers or data, and may be generated and/or derived from proofs themselves, the public inputs, and/or the private inputs. The verification keys 224 may be used to validate the authenticity of the zero-knowledge proofs 221 without revealing the underlying sensitive information. In some examples, the verification keys 224 can serve as a reference point for the blockchain to confirm that the proofs have been generated and verified by a trusted entity. By storing these verification keys 224 on the blockchain, the platform enables the verification process to be transparent, secure, and immutable, allowing parties to confidently engage in transactions while maintaining data privacy.

In certain embodiments, the ZKP controller 220 can transparently manage the generation and/or verification of zero-knowledge proofs 221 to avoid burdening end-users 105 with the technical complexities associated with using ZKP functionalities. For example, end-users 105 may simply provide requested information via user-friendly forms included on front-end interfaces 154, such as entering their login credentials or compliance data. In the background, the ZKP controller 220 handles the technical aspects by executing cryptographic algorithms to generate ZKP proofs based on the provided information, registering verification keys on the blockchain network 130, and/or verifying the proofs when such is needed (e.g., to prove satisfaction of smart contract conditions). This provides a user experience that is seamless and efficient for the end-users 105, allowing end-users 105 to benefit from enhanced security and privacy without needing to understand or manage the underlying cryptographic processes.

The smart contract dApp 260 and/or the smart contracts 265 themselves may store and execute a proof verification function 223 to validate or verify any zero-knowledge proofs 221 provided by end-users. The proof verification function 223 can utilize cryptographic algorithms to ensure the authenticity and/or validity of the zero-knowledge proofs 221 submitted by end-users. When a zero-knowledge proof 221 is submitted by the platform 150, the function can retrieve the corresponding verification key 224, which has been previously registered and stored within the smart contract dApp 260 and/or the generated smart contracts 265. This verification key 224 operates as a cryptographic reference that used for the validation process.

In some embodiments, the proof verification function 223 then performs a series of cryptographic operations to compare the submitted proof against the expected outcomes defined by the verification key 224. This may involve checking the mathematical integrity of the proof, ensuring that it aligns with the cryptographic commitments made during the proof generation phase. The verification process is designed to be efficient, allowing for rapid validation without revealing any underlying sensitive information contained within the proof.

If the proof is deemed valid, the proof verification function 223 can confirm the authenticity of the statement or condition that the proof represents, allowing the smart contract 265 to proceed with the associated transaction or operation. Conversely, if the proof fails validation, the proof verification function 223 will reject it, preventing any unauthorized or fraudulent actions from being executed on the blockchain. This ZKP-based smart contract validation process provides a robust verification mechanism that helps ensure that all interactions with the smart contract are secure and trustworthy, maintaining the integrity of the decentralized application.

In certain embodiments, the ZKP verification process begins with the generation of a zero-knowledge proof 211 by a proof generation function 222, where the end-user 105 and/or ZKP controller 220 converts their sensitive data into a mathematical form compatible with one or more ZKP schemes or protocols supported by the legal transaction platform 150. This can be achieved using specialized cryptographic functions to generate the zero-knowledge proof 211. The end-user 105 also may prepare public inputs for the verification process and/or the legal transaction platform 150 can be preconfigured with functionalities identifying the public inputs. Once the zero-knowledge proof 211 is generated, a trusted authority (e.g., an administrator or the ZKP controller 220) registers the corresponding verification key 224 in the smart contract 265 on the blockchain. For proof verification, the end-user 105 and/or ZKP controller 220 submits the zero-knowledge proof 211 and public inputs to the smart contract 265 on the blockchain network 130. The proof verification function 223 stored with the smart contract 265, then utilizes the registered verification key 224 to validate the proof. If the zero-knowledge proof 211 is deemed valid, the system confirms the statement's validity while keeping the underlying secret data confidential. This workflow protects sensitive information while enabling secure and transparent verification on the blockchain.

The token controller 225 can include software and/or programming logic configured to manage the exchange, transfer, distribution, and/or ownership of the tokens 165. Any functionality described in this disclosure with respect to managing tokens 165 offered via the legal transaction platform 150 and/or with respect to communicating with a blockchain network 130 to manage the tokens 165 can be performed by the token controller 225. In some embodiments, the token controller 225 can be integrated with a decentralized autonomous organization stored on, or associated with, the legal transaction platform 150, which is described in further detail in other portions of this disclosure.

In certain embodiments, the token controller 225 can include software and/or programming logic configured to communicate with one or more blockchain networks 130 in connection with managing, exchanging, and/or transferring tokens 165 among end-users 105 and/or the legal transaction platform 150, as well as to update the ownership of the tokens 165. In certain embodiments, the token controller 225 can be configured to append blocks or data to a distributed ledger, such as the distributed legal transaction ledger 250 and/or another ledger, to facilitate the aforementioned functions and/or other functions related to managing the tokens 165.

In certain embodiments, the token controller 225 may be configured to communicate with a blockchain network 130 to exchange, transfer, or update ownership of tokens 165 based on interactions with, or legal transactions 155 conducted using, the tokenized legal ecosystem 160. For example, when a client user hires a legal professional through the platform 150, the token controller 225 can facilitate the transfer of tokens 165 from the client's account to the legal professional's account upon completion of the agreed services and/or the conclusion of a smart contract. In another example, if a dispute 182 arises between the parties, the token controller 225 can place the tokens 165 in escrow until the dispute 182 is resolved, ensuring that neither party can access the funds prematurely. In a further example, the token controller 225 can also manage loyalty rewards by automatically allocating additional tokens 165 to client end-users and/or legal professional end-users who frequently engage or utilize the platform 150, thereby incentivizing continued use and fostering a robust ecosystem. In a further example, The token controller 225 may also be configured to manage token transfers in connection with milestone-based legal transactions. For instance, smart contracts may set specific milestones that need to be achieved during the course of a legal transaction 155. In response to determining that the conditions of a milestone have been completed, the token controller 225 can transfer a portion of the tokens 165 to the legal professional end-user as compensation for completing that milestone. This approach can help to ensure that legal professionals are compensated incrementally as they fulfill their contractual obligations, providing a structured and transparent payment process that aligns with the progress of the legal services rendered.

The token controller 225 can facilitate the transfer and/or exchange of tokens 165 in many other scenarios in addition to those explicitly mentioned in this disclosure.

The decentralized storage controller 230 can include software and/or programming logic configured to manage the storage of transaction documentation 152 (and/or any other information or data associated with the legal transaction platform 150) in one or more distributed storage systems 240. In some embodiments, the decentralized storage controller 230 may communicate with a distributed storage network 140 to facilitate the storage of transaction documentation 152 and/or other data across the nodes of the distributed storage system 240 and/or to facilitate access or retrieval of the transaction documentation 152 and/or other data from the distributed storage system 240.

As mentioned above, in some cases, the distributed storage system 240 may be independent of blockchain technologies and, in other cases, the distributed storage system 240 can be integrated with, or utilize, one or more blockchain networks 130 (e.g., to leverage functionalities for data verification, data tracking, payment, and/or authentication). In scenarios where the distributed storage system 240 is integrated with blockchain technologies, the software and/or programming logic associated with the decentralized storage controller 230 can be configured to communicate with one or more blockchain networks 130 in connection with performing the aforementioned functionalities and/or other functionalities.

The components illustrated in FIG. 2 can be combined or integrated in various ways to implement the functionalities described herein. For example, while the components of the decentralized network integration system 170 (e.g., the smart contract controller 210, ZKP controller 220, token controller 225, and decentralized storage controller 230) may be described as being distinct components in some instances, it should be understood that the functionalities of the components can be combined or integrated in any manner whatsoever (e.g., a single controller could perform all of the functions associated with these components) and the labels assigned to these components are merely to facilitate understanding of the techniques and functions described herein.

Figure 3:
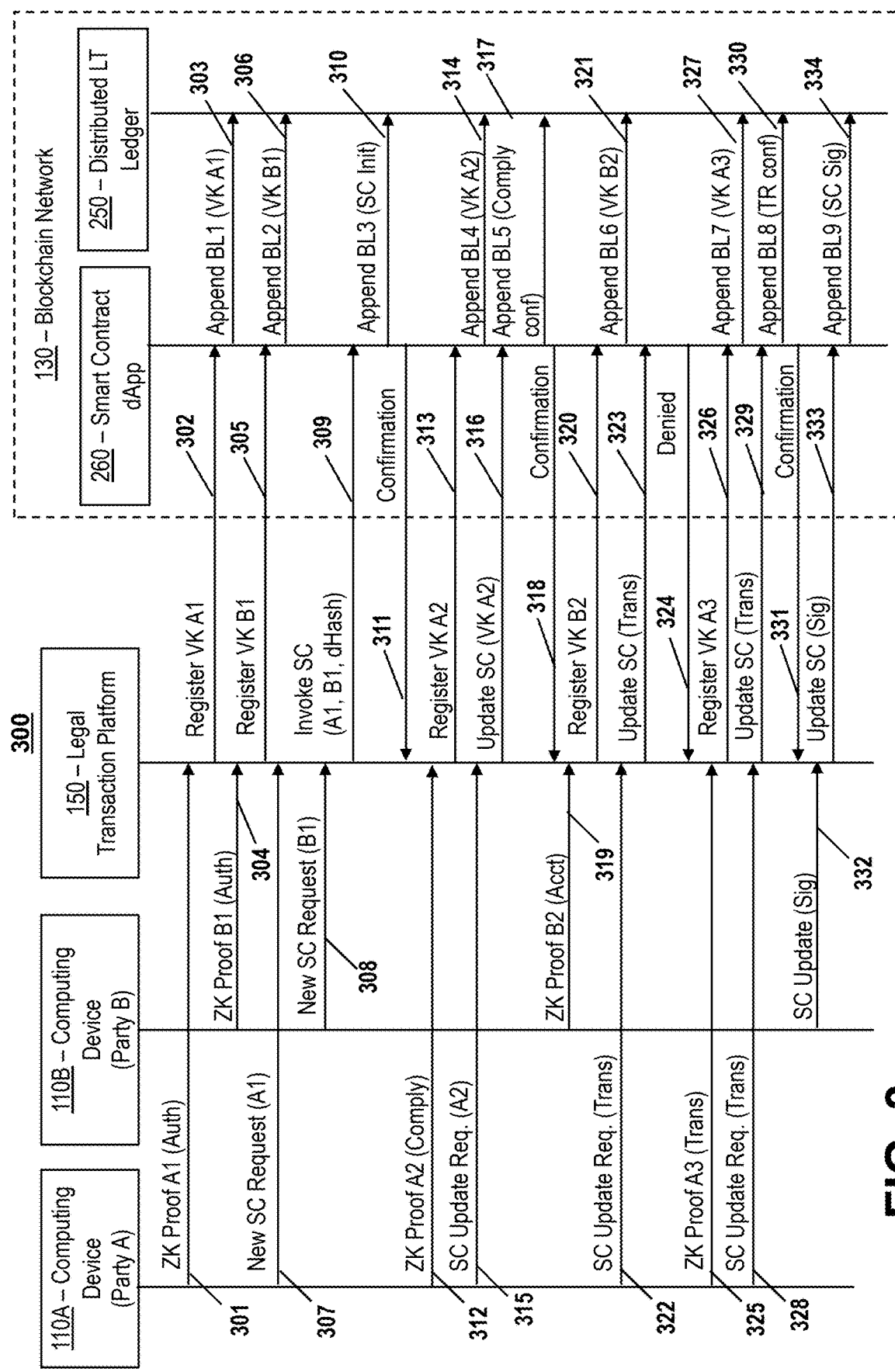
FIG. 3 is a sequence diagram illustrating an exemplary communication exchange among devices in connection with using smart contracts integrated with ZKP functionalities to conduct a legal transaction in accordance with certain embodiments.

FIG. 3 is a sequence diagram illustrating an exemplary communication exchange 300 among various devices in connection with using smart contracts integrated with ZKP functionalities to conduct a legal transaction 155 according to certain embodiments.

This exemplary communication exchange 300 is intended to demonstrate various applications of ZKP functionalities in connection with conducting legal transactions 155. However, these examples are for illustrative purposes only, and the specific applications of ZKP functionalities employed can vary greatly across different types of smart contracts 265 and/or across different types of legal transactions 155. For example, depending on the requirements or obligations of a particular legal transaction 155 (or smart contract corresponding to the legal transaction 155), the processing may incorporate some or all of the ZKP validations described with respect to FIG. 3, or it may utilize none of those applications or different applications of ZKP technologies altogether.

The exemplary communication exchange 300 involves electronic communications among a first computing device 110A operated by Party A (e.g., which may correspond to a client end-user 105A), a second computing device 110B operated by Party B (e.g., which may correspond to a legal professional end-user 105B), the legal transaction platform 150, and a blockchain network 130. A smart contract decentralized application 260 is stored and executed on the blockchain network 130, and a distributed legal transaction ledger 250 records various blocks corresponding to legal transactions 155 conducted using the smart contract decentralized application 260.

In some exemplary scenarios, Party A may represent a client-end user (e.g., a corporate client or individual) that is engaging the legal services of Party B, who represents a legal professional end-user (e.g. an attorney or law firm), and the parties are using ZKP-based smart contact technologies to securely exchange and verify various types of information in connection with conducting a legal transaction 155.

In step 301, the first computing device 110A operated by Party A transmits a zero-knowledge proof 221 (ZK Proof A1) to the legal transaction platform 150 and/or causes the legal transaction platform 150 to generate the zero-knowledge proof 221. The zero-knowledge proof 221 is intended to authenticate Party A, such as by proving the identity of Party A and/or Party A's knowledge of a password or login credentials to access a user account on the legal transaction platform 150 without revealing sensitive information (e.g., such as the password and/or username associated with the user account).

In some embodiments, step 301 may be performed when Party A is creating and/or updating a user account with the legal transaction platform. The incorporation of ZKP functionalities provides a password-less authentication framework that enables Party A to confirm knowledge of their secret key (e.g., password or login credentials) using a zero-knowledge proof 221 without revealing the underlying authentication information. In certain embodiments, after Party A is authenticated using ZKP techniques, Party A's identity is proven and Party A may engage in various activities, such as searching for legal professional end-users, signing documents or forms, entering into agreements with legal professional end-users, etc.

In other embodiments, step 301 may be performed when Party A is entering into a smart contract 265 with another party, such as Party B, and the zero-knowledge proof 221 can be utilized to validate Party A's identity for the smart contract 265.

Any appropriate proof generation function (e.g., zk-SNARKs, zk-STARKs, NIZK, PLONK, Bulletproofs, etc.) can be utilized to generate the zero-knowledge proof for authenticating Party A. In some examples, the zero-knowledge proof can be generated based on a combination of private inputs, such as the user's username, password, and/or other login credentials, and public inputs, such as a cryptographic hash of all registered users stored by the legal transaction platform. Additionally, the platform may enable the zero-knowledge proof 221 to be generated in a manner that is transparent to the user. For instance, the user may simply enter their login credentials via a front-end interface 154, and the platform may generate the proof 221 by executing a proof generation function 222, which is configured to verify the credentials against the stored hash and generate a zero-knowledge proof that confirms the user's identity without revealing the actual login information.

In step 302, the legal transaction platform 150 operates as a trusted party and registers a verification key 224 (VK A1) corresponding to the zero-knowledge proof 221 provided by Party A with the smart contract decentralized application 260 stored on the blockchain network 130. In some embodiments, registering the verification key 224 may involve storing or associating the verification key 224 with an account associated with the smart contract dApp 260 or blockchain network 130 and/or appending a block to the distributed legal transaction ledger 250 to enable the smart contract dApp 260 to access the verification key 224.

Again, in certain embodiments, the registration of the zero-knowledge proof 221 may be seamlessly performed in a manner that is transparent to Party A. For example, the legal transaction platform 150 may have one or more accounts or wallets that enable it to interact with the smart contract decentralized application 260 and/or blockchain network 130, and the legal transaction platform 150 may absorb any network transaction costs associated with registering the verification key 224. Party A may simply be provided with a confirmation via a front-end interface 154 when the verification key 224 is registered and/or may not even know that such verification key 224 has been registered.

In step 303, the decentralized application 260 appends a block (BL1) to the distributed legal transaction ledger 250 reflecting the registration of the verification key (VK A1). In some embodiments, a confirmation message may be sent to the legal transaction platform 150 and/or Party A upon successfully appending the block to the distributed legal transaction ledger 250 with related details (e.g., indicating the block address, a timestamp indicating when the block was added, etc.).

In step 304, the second computing device 110B operated by Party B transmits a zero-knowledge proof 221 (ZK Proof B1) to the legal transaction platform 150 and/or causes the legal transaction platform 150 to generate the zero-knowledge proof 211. In this exemplary communication, the zero-knowledge proof 221 is intended to authenticate Party B, such as by proving the identity of Party B and/or Party B's knowledge of a password or login credentials to access a user account on the legal transaction platform 150 without revealing sensitive information (e.g., such as the password and/or username associated with the user account).

The generation of the proof 221 in step 304 may be performed when Party B is creating and/or updating a user account with the legal transaction platform and/or entering into a smart contract 265. As mentioned above, the incorporation of ZKP functionalities can provide a password-less authentication framework that enables Party B to confirm knowledge of their secret key (e.g., password or login credentials) using a zero-knowledge proof 221 without revealing the underlying authentication information. In certain embodiments, after Party B is authenticated using ZKP techniques, Party B's identity is proven and Party A may engage in various activities, such as reviewing work proposals submitted by clients, signing documents or forms, and/or entering into agreements with client end-users.

Again, any appropriate cryptographic proof generation function 222 can be utilized to generate the zero-knowledge proof 221 for Party B using the same or similar techniques described above with respect to step 301.

In step 305, the legal transaction platform 150 operates as a trusted party and registers a verification key (VK B1) corresponding to the zero-knowledge proof 221 provided by Party B with the smart contract decentralized application 260 stored on the blockchain network 130. Again, in certain embodiments, the generation and registration of the zero-knowledge proof 221 may be seamlessly performed in a manner that is transparent to Party B in the same or similar manner described above for steps 301 and 302.

In step 306, the smart contract decentralized application 260 appends a block (BL2) to the distributed legal transaction ledger 250 reflecting the registration of the verification key (VK B1). In some embodiments, a confirmation message may be sent to the legal transaction platform 150 and/or Party B upon successfully appending the block to the distributed legal transaction ledger 250 (e.g., indicating the block address, a timestamp indicating when the block was added, etc.).

After the ZKP-based authentication is established for Party A and Party B, the parties may access the legal transaction platform 150 using their corresponding zero-knowledge proofs 221 and without providing a password or other sensitive login credentials. Each time a party accesses the legal transaction platform 150, the ZKP controller 220 and/or decentralized network integration system 170 may communicate with the blockchain network 130 and/or smart contract dApp 260 to verify and authenticate the party using a zero-knowledge proof 221. Once authenticated, Party A and Party B may be authorized to perform various activities via the platform, such as entering into smart contracts 265, signing transaction documentation 152, etc.

In steps 307 and 308, Party A and Party B submit a request to initiate a new smart contract 265 in connection with a legal transaction 155 to be conducted between the parties. Each party may access and utilize functionalities available via the front-end interfaces 154 to customize the terms, conditions, and/or parameters relating to the smart contract and corresponding legal transaction. For example, the terms of the smart contract may be memorialized in an electronic document that defines the pricing, timeline, and/or services to be rendered in connection with the legal transaction 155.

In certain embodiments, Party A and Party B utilize authentication proofs (ZK Proof A1 and ZK Proof B1) to electronically sign the electronic document and/or smart contract. Additionally, or alternatively, Party A and Party B may be authorized to sign the electronic document and/or smart contract after the authentication proofs are utilized to log in to the legal transaction platform 150. In some examples, the electronic document and/or the zero-knowledge proofs 221 utilized for signatures may be sent to the legal transaction platform 150 with a request to initiate a new smart contract for the legal transaction 155.

In step 309, the legal transaction platform 150 may transmit a request (Invoke SC) to the smart contract dApp 260 to initiate the smart contract pertaining to the legal transaction 155. In some embodiments, the request may include the zero-knowledge proofs (ZK Proof A1 and ZK Proof B1) which authenticate the parties and the corresponding public inputs. A proof verification function 223 executed by the smart contract decentralized application 260 may utilize the verification keys (VK A1 and VK B1) stored on the distributed legal transaction ledger 250 to confirm the validity of the proofs as a condition to initiating the smart contract. If valid, the smart contract decentralized application 260 will create the smart contract without revealing the sensitive information corresponding to the parties.

Additionally, in some embodiments, the legal transaction platform 150 may apply a hashing function to generate a document hash value (dHash) corresponding to the electronic document defining the scope and/or parameters of the legal transaction 155, and that document hash value may be sent with the request to initiate the smart contract.

In step 310, the smart contract decentralized application 260 appends a block (BL3) to the distributed legal transaction ledger 250 reflecting the initiation of the smart contract 265 involving Party A and Party. The manner in which the smart contract is appended to the distributed legal transaction ledger 250 enables all of the information pertaining to the parties and their contract to be securely protected. For example, in some embodiments, the block appended to the distributed legal transaction ledger 250 may utilize the zero-knowledge proofs (ZK Proof A1 and ZK Proof B1) and/or corresponding verification keys (VK A1 and VK B1) to identify the parties to the smart contract 265. Additionally, the block may utilize the document hash value (dHash) to identify the underlying electronic document that defines the scope and/or parameters of the legal transaction 155.

As explained in other portions of this disclosure, the confidentiality and security of the legal transaction 155 can further be protected by storing the electronic document in a decentralized storage system 240 which, in some cases, may segment the electronic document into multiple portions, separately encrypt each portion, and store the various portions across different nodes of a distributed storage network 140.

In step 311, the smart contract decentralized application 260 returns a confirmation message to the legal transaction platform 150 that confirms the creation of the smart contract. The confirmation message may identify the block address, timestamp, and/or other relevant details about the storage of the smart contract on the distributed legal transaction ledger 250.

In step 312, the first computing device 110A operated by Party A transmits a zero-knowledge proof 221 (ZK Proof A2) to the legal transaction platform 150 and/or causes the legal transaction platform 150 to generate the zero-knowledge proof 221. The zero-knowledge proof 221 is intended to prove that Party A satisfies compliance requirements, such as KYC (Know-Your-Customer), AML (Anti-Money Laundering), and/or other compliance regulations, without revealing sensitive information (e.g., such as Party A's name, address, date of birth, government ID, tax identification number, bank account information, source of funds, transaction counterparties, etc.).

Any suitable proof generation function 222 can be employed to generate the zero-knowledge proof for Party A in step 312. In some examples, the proof can be constructed using a combination of private inputs, such as Party A's personal details (e.g., name, address, date of birth, government ID, tax identification number, bank account information, source of funds, and transaction counterparties), and public inputs, such as a registry, database, or listing of compliance requirements stored by regulatory entities. As described above, the legal transaction platform 150 may facilitate the generation of the zero-knowledge proof in a manner that is transparent to Party A. For instance, Party A can input their private data through a front-end interface 154, and the platform will execute a proof generation function 222 that verifies compliance with KYC, AML, and other regulations, producing a zero-knowledge proof that confirms Party A's compliance without disclosing any sensitive information.

In step 313, the legal transaction platform 150 operates as a trusted party and registers a verification key (VK A2) corresponding to the zero-knowledge proof 221 provided by Party A with the smart contract decentralized application 260 stored on the blockchain network 130.

In step 314, the decentralized application 260 appends a block (BL4) to the distributed legal transaction ledger 250 reflecting the registration of the verification key (VK A2). In some embodiments, a confirmation message may be sent to the legal transaction platform 150 and/or Party A upon successfully appending the block to the distributed legal transaction ledger 250 (e.g., indicating the block address, timestamp, and/or other related details).

In step 315, the first computing device 110A operated by Party A sends a request (SC Update Req.) to update the previously established smart contract 265 to prove compliance obligations associated with the legal transaction 155 are satisfied. The request may include or identify the cryptographic ZK proof (ZK Proof A2).

In step 316, the legal transaction platform 150 may transmit a request to the smart contract decentralized application 260 to update the smart contract to reflect that Party A has satisfied compliance obligations. In some embodiments, the request may include the zero-knowledge proof (ZK Proof A2) and the corresponding public inputs, and a proof verification function 223 executed by the smart contract decentralized application 260 may utilize the verification key (VK A2) stored on the distributed legal transaction ledger 250 to confirm the validity of the proofs as a condition to updating the smart contract. If valid, the smart contract decentralized application 260 will update the smart contract without revealing the underlying sensitive compliance information.

In step 317, the smart contract decentralized application 260 appends a block (BL5) to the distributed legal transaction ledger 250 to update the smart contract and confirm that Party A's compliance obligations are satisfied. The manner in which the block is appended to the distributed legal transaction ledger 250 enables confirmation of the compliance obligations without revealing sensitive compliance information. For example, in some embodiments, the block appended to the distributed legal transaction ledger 250 may utilize the zero-knowledge proof (ZK Proof A2) and/or the corresponding verification key (VK A2) to confirm compliance conditions are satisfied.

In step 318, the smart contract decentralized application 260 returns a confirmation message to the legal transaction platform 150 that confirms the update to the smart contract. The confirmation message may identify the block address, timestamp, and/or other relevant details about the block (BL5) appended on the distributed legal transaction ledger 250.

In step 319, the second computing device 110B operated by Party B transmits a zero-knowledge proof 221 (ZK Proof B2) to the legal transaction platform 150 and/or causes the legal transaction platform 150 to generate the zero-knowledge proof 221. The zero-knowledge proof 221 is intended to prove that Party B's transaction account information (e.g., which may correspond to an account with a traditional banking institution and/or a crypto wallet account) without revealing sensitive information (e.g., such as Party B's account number, wallet address, etc.).

Any suitable proof generation function 222 can be employed to generate the zero-knowledge proof 221 for Party B in step 319. In some examples, the proof can be constructed using a combination of private inputs, such as Party B's transaction account details (e.g., account number, wallet address, balance information, and transaction history), and public inputs, such as a registry, database, or listing of verified accounts stored by financial institutions or blockchain networks. As described above, the legal transaction platform 150 may facilitate the generation of the zero-knowledge proof 221 in a manner that is transparent to Party B. For instance, Party B can input their private account data through a front-end interface 154, and the platform will execute a proof generation function 222 that verifies the account's validity and/or compliance with financial regulations, producing a zero-knowledge proof that confirms Party B's account information without disclosing any sensitive details.

In step 320, the legal transaction platform 150 operates as a trusted party and registers a verification key (VK B2) corresponding to the zero-knowledge proof 221 provided by Party B with the smart contract decentralized application 260 stored on the blockchain network 130.

In step 321, the decentralized application 260 appends a block (BL6) to the distributed legal transaction ledger 250 reflecting the registration of the verification key (VK B2). In some embodiments, a confirmation message may be sent to the legal transaction platform 150 and/or Party B upon successfully appending the block to the distributed legal transaction ledger 250 (e.g., indicating the block address, timestamp, and/or other related details).

In step 322, the first computing device 110A operated by Party A sends a request (SC Update Req.) to update the previously established smart contract 265 to prove payment to Party B. However, the request does not include a corresponding proof to identify the payment transaction details.

In step 323, the legal transaction platform 150 may transmit a request to the smart contract decentralized application 260 attempting to update the smart contract to reflect that Party A has satisfied payment obligations.

In step 324, the smart contract decentralized application 260 denies the request to update the smart contract 265. In this example, a zero-knowledge proof 221 was not provided by Party A for securely verifying the payment transaction and, therefore, the proof verification function 223 denies the attempt to update the smart contract 265.

In step 325, the first computing device 110A operated by Party A transmits a zero-knowledge proof 221 (ZK Proof A3) to the legal transaction platform 150 and/or causes the legal transaction platform 150 to generate the zero-knowledge proof 221. The zero-knowledge proof 221 is intended to prove that Party A has rendered payment for legal services to Party B in accordance with the terms of the smart contract 265, without revealing sensitive information (e.g., such as Party A's payment amounts, account numbers, wallet addresses, etc.).

Any suitable proof generation function 222 can be employed to generate the zero-knowledge proof 221 for Party A in step 325. In some examples, the proof can be constructed using a combination of private inputs, such as Party A's payment details (e.g., payment amount, account number, wallet address, and/or transaction history), and public inputs, such as a registry, database, or listing of verified transactions stored by financial institutions or blockchain networks. As described above, the legal transaction platform 150 may facilitate the generation of the zero-knowledge proof 221 in a manner that is transparent to Party A. For instance, Party A can input their private payment data through a front-end interface 154, and the platform will execute a proof generation function 222 that verifies the payment's validity and compliance with the terms of the smart contract 265, producing a zero-knowledge proof that confirms Party A's payment without disclosing any sensitive details.

In step 326, the legal transaction platform 150 operates as a trusted party and registers a verification key (VK A3) corresponding to the zero-knowledge proof 221 provided by Party A with the smart contract decentralized application 260 stored on the blockchain network 130. Again, in certain embodiments, the registration of the zero-knowledge proof 221 may be seamlessly performed in a manner that is transparent to Party A.

In step 327, the decentralized application 260 appends a block (BL7) to the distributed legal transaction ledger 250 reflecting the registration of the verification key (VK A3). In some embodiments, a confirmation message may be sent to the legal transaction platform 150 and/or Party A upon successfully appending the block to the distributed legal transaction ledger 250 (e.g., indicating the block address, timestamp, and/or other related details).

In step 328, the first computing device 110A operated by Party A sends a request (SC Update Req.) to update the previously established smart contract 265 to prove payment was rendered to Party B. The request may include or identify the zero-knowledge proof (ZK Proof A3).

In step 329, the legal transaction platform 150 may transmit a request to the smart contract decentralized application 260 to update the smart contract to reflect that Party A has satisfied payment obligations. In some embodiments, the request may include the zero-knowledge proof (ZK Proof A3) and the corresponding public inputs, and a proof verification function 223 executed by the smart contract decentralized application 260 may utilize the verification key (VK A3) stored on the distributed legal transaction ledger 250 to confirm the validity of the proof as a condition to updating the smart contract. If valid, the smart contract decentralized application 260 will update the smart contract without revealing the underlying sensitive payment information.

In step 330, the smart contract decentralized application 260 appends a block (BL8) to the distributed legal transaction ledger 250 to update the smart contract and confirm that Party A's payment obligations are satisfied. The manner in which the block is appended to the distributed legal transaction ledger 250 enables confirmation of the payment obligations without revealing the sensitive information. For example, in some embodiments, the block appended to the distributed legal transaction ledger 250 may utilize the zero-knowledge proof (ZK Proof A3) and/or the corresponding verification key (VK A3) to confirm payment conditions are satisfied.

In step 331, a confirmation message may be sent to the legal transaction platform 150 and/or Party A upon successfully appending the block to the distributed legal transaction ledger 250 (e.g., indicating the block address, timestamp, and/or other related details).

In step 332, the second computing device 110B operated by Party B sends a request (SC Update Req.) to update the previously established smart contract 265 which includes a signature from Party B confirming receipt of Party A's payment and conclusion of the smart contract 265. In some examples, the signature of Party B may be permitted or authorized in response to Party B accessing the legal transaction platform 150 using its authentication proof (ZK Proof B1) and/or in response to authenticating the party's identity with the smart contract 265.

In step 333, the legal transaction platform 150 may transmit a request to the smart contract decentralized application 260 to update the smart contract 265 to reflect that Party B has acknowledged payment and/or reflect the conclusion of the smart contract 265.

In step 334, the smart contract decentralized application 260 appends a block (BL9) to the distributed legal transaction ledger 250 to update the smart contract to confirm that Party A's payment obligations are satisfied and/or to indicate the conclusion of the smart contract 265.

The examples described above in steps 301-334 demonstrate how the combination of ZKP and smart contract technologies can be integrated into a legal transaction platform 150 to securely and transparently facilitate legal transactions 155. However, as mentioned above, these examples are for illustrative purposes only, and the usage of ZKP functionalities to prove various conditions can vary greatly to accommodate the terms or obligations of the smart contracts and/or legal transactions 155. The combination of ZKP and smart contract technologies can be utilized to facilitate the secure and transparent exchange of information in many other contexts.

In some examples, a party (e.g., a client end-user) to a smart contract 265 can utilize a zero-knowledge proof 221 to prove that the party is a verified business entity or registered company without revealing sensitive information (e.g., such as the company name, company registration number, and/or tax identification number). For instance, the zero-knowledge proof 221 can be generated based on a combination of private inputs (e.g., the party's name, registration certificate, registration number, and/or tax identification number) and public inputs (e.g., a cryptographic hash of all verified business entities stored by a regulatory agency). In the same or similar manner described above, the proof generation function 222 can generate the zero-knowledge proof 221, the legal transaction platform 150 can register a verification key 224 corresponding to the proof with a blockchain network 130, and the proof verification function 223 can utilize the verification key 224 to verify the party's proof.

In other examples, a party (e.g., a legal professional end-user) to a smart contract 265 can utilize a zero-knowledge proof 221 to prove that the party is a registered attorney or law firm entity in good standing (e.g., without revealing sensitive information such as the attorney's personal name or the law firm's tax identification number). For instance, the zero-knowledge proof 221 can be generated based on a combination of private inputs (e.g., Party B's name, attorney registration number, and/or a law firm's tax identification number) and public inputs (e.g., a cryptographic hash of all verified registered attorneys or law firm entities in good standing that stored by a regulatory agency). In the same or similar manner described above, the proof generation function 222 can generate the zero-knowledge proof 221, the legal transaction platform 150 can register a verification key 224 corresponding to the proof with a blockchain network 130, and the proof verification function 223 can utilize the verification key 224 to verify the party's proof.

In further examples, a party (e.g., a client end-user) to a smart contract 265 can utilize a zero-knowledge proof 221 to prove that the party has sufficient funds to engage in a legal transaction without revealing sensitive financial information (e.g., such as bank account balances or transaction history). For instance, the zero-knowledge proof 221 can be generated based on a combination of private inputs (e.g., the party's account balance, recent transactions, and/or financial statements) and public inputs (e.g., a cryptographic hash of verified financial data stored by a banking institution). In the same or similar manner described above, the proof generation function 222 can generate the zero-knowledge proof 221, the legal transaction platform 150 can register a verification key 224 corresponding to the proof with a blockchain network 130, and the proof verification function 223 can utilize the verification key 224 to verify the party's proof.

The techniques described above can be applied in many other contexts to securely and transparently facilitate legal transactions 155. Furthermore, the examples described above regarding FIG. 3, as well as other sections of this disclosure, can be adapted to securely verify information for various types of transactions. These include transactions between accountants or accounting firms and their clients, transactions between healthcare providers and patients, transactions with title companies, and more generally, transactions involving end-users seeking services and those providing services.

Figure 6:
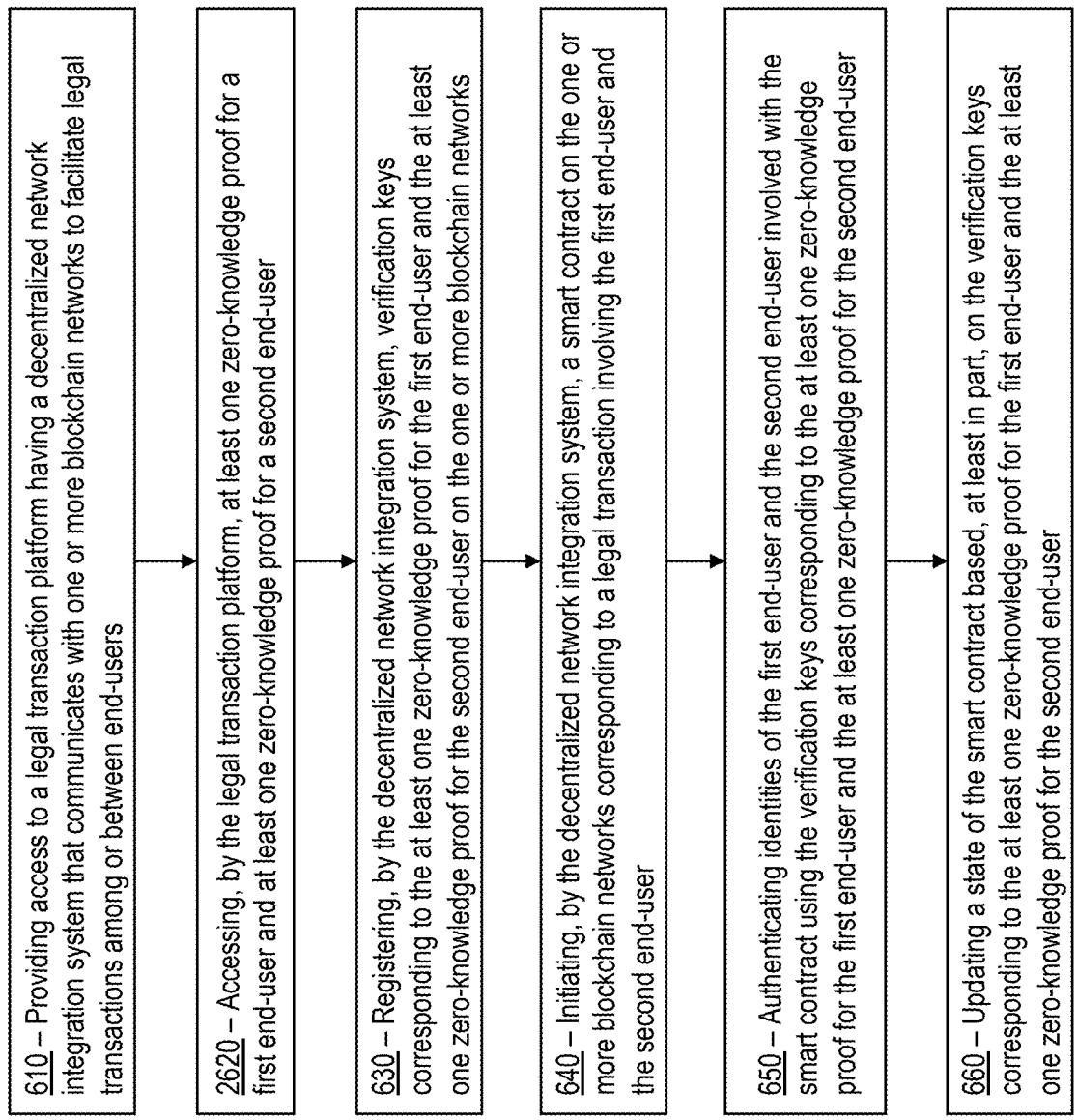
FIG. 6 is a flowchart illustrating an exemplary method for conducting a legal transaction using ZKP and smart contract technologies in accordance with certain embodiments.

FIG. 6 illustrates a flow chart for an exemplary method 600 according to certain embodiments. Method 600 is merely exemplary and is not limited to the embodiments presented herein. Method 600 can be employed in many different embodiments or examples not specifically depicted or described herein. In some embodiments, the steps of method 600 can be performed in the order presented. In other embodiments, the steps of method 600 can be performed in any suitable order. In still other embodiments, one or more of the steps of method 600 can be combined or skipped. In many embodiments, system 100, legal transaction platform 150, and/or decentralized network integration system 170 can be configured to perform method 600 and/or one or more of the steps of method 600. In these or other embodiments, one or more of the steps of method 600 can be implemented as one or more computer instructions configured to run at one or more processing devices 102 and configured to be stored at one or more non-transitory computer storage devices 101. Such non-transitory memory storage devices 101 can be part of a computer system such as system 100, server 120, and/or legal transaction platform 150.

In step 610, access is provided to a legal transaction platform 150 having a decentralized network integration system 170 that communicates with one or more blockchain networks 130 to facilitate legal transactions among or between end-users. In some examples, the end-users 105 may utilize computing devices 110 to access the legal transaction platform 150 over a network 115, and the legal transaction platform 150 may operate as an intermediary or middle layer positioned between end-users 105 and the blockchain networks 130, enabling the end-users to seamlessly leverage blockchain functionalities without burdening end-users 105 with the technical complexities often associated with usage of blockchain technologies.

In step 620, the legal transaction platform accesses at least one zero-knowledge proof 221 for a first end-user and at least one zero-knowledge proof 221 for a second end-user.

In step 630, the decentralized network integration system 170 registers verification keys 224 corresponding to the at least one zero-knowledge proof 221 for the first end-user and the at least one zero-knowledge proof 221 for the second end-user on the one or more blockchain networks 130.

In step 640, the decentralized network integration system 170 initiates a smart contract 265 on the one or more blockchain networks 130 corresponding to a legal transaction 155 involving the first end-user and the second end-user.

In step 650, the identities of the first end-user and the second end-user involved with the smart contract 265 are authenticated using the verification keys 224 corresponding to the at least one zero-knowledge proof 221 for the first end-user and the at least one zero-knowledge proof 221 for the second end-user.

In step 660, a state of the smart contract 265 is updated based, at least in part, on the verification keys 224 corresponding to the at least one zero-knowledge proof 221 for the first end-user and the at least one zero-knowledge proof 221 for the second end-user. In some examples, updating a state of the smart contract 265 based on the verification keys 224 may include updating the smart contract 265 to validate a party's compliance with KYC/AML obligations, validate a payment or transaction by a party, confirm the completion of contractual milestones by a party, verify the authenticity of digital signatures provided by one or more of the parties, verifying services rendered by a party, and/or validating or verifying other terms or conditions associated with the smart contract 265. In certain embodiments, updating a state of the smart contract 265 also may include appending one or more blocks to a distributed legal transaction ledger 250 associated with the legal transaction 155.

The decentralized network integration system 170 described herein incorporates several technical improvements. Amongst other things, it can leverage the integration of ZKP technologies with smart contract technologies to enhance the security and privacy of conducting legal transactions and/or other types of transactions. The integration can permit parties to authenticate their identities and/or validate transaction details or obligations without revealing sensitive information, thereby reducing the risk of data breaches and unauthorized access. The use of ZKP ensures that only the non-sensitive information is disclosed, maintaining confidentiality on sensitive data while still enabling the verification of contractual terms. Additionally, the usage of ZKP and smart contract technologies enhances the efficiency and transparency of transaction processing by automating verification processes, reducing the need for manual intervention, and ensuring that all interactions are securely recorded on the blockchain. This results in a more robust, transparent, and trustworthy transaction environment, fostering greater confidence among parties engaging in digital transactions.

The decentralized network integration system 170 addresses several challenges inherent in traditional systems, including those discussed in earlier sections of this disclosure. Traditional systems often rely on centralized infrastructures, which create single points of failure and are vulnerable to cyberattacks, leading to data breaches and unauthorized access. By integrating ZKP technologies with blockchain-based smart contracts, the system can eliminate the need to store or transmit sensitive information, significantly reducing the risk of data exposure. This cryptographic approach ensures that parties can authenticate identities and validate transaction details without compromising privacy, overcoming the limitations of conventional methods that require direct data sharing. Furthermore, traditional systems are typically burdened by manual processes, which are time-consuming and prone to human error. The automated verification processes enabled by ZKP and smart contracts streamline transaction handling, enhancing efficiency and transparency. This automation not only reduces the reliance on manual intervention but also ensures that all interactions are immutably recorded on the blockchain, providing a secure and trustworthy environment for digital transactions. As such, the system fosters greater confidence among users by offering a robust solution that addresses the security, privacy, and efficiency shortcomings of traditional systems.

The integration of distributed storage systems also introduces several technical improvements that enhance the security, reliability, and efficiency of data management. Unlike traditional centralized storage solutions, distributed storage systems distribute data across multiple nodes, eliminating single points of failure and significantly reducing the risk of data loss due to hardware malfunctions or cyberattacks. This decentralized approach ensures redundancy, as data is replicated across various locations, providing robust fault tolerance and enhancing data availability. Additionally, distributed storage systems can employ advanced encryption techniques to secure data, ensuring that sensitive information remains protected from unauthorized access.

Additionally, in some embodiments, the integration of these distributed storage systems with blockchain technology further enhances data integrity, as transaction documentation and/or other data can be cryptographically verified and linked to a blockchain ledger (thus, providing an immutable record of data transactions) while the actual documentation can be securely stored across the nodes of the decentralized storage network, ensuring that the data is both protected from unauthorized access and redundantly available. This combination of distributed storage and blockchain technology not only improves the security and reliability of data storage but also helps ensure the integrity of the documentation during subsequent access and retrieval, enabling efficient and transparent data management across diverse environments. As such, the system can offer a comprehensive solution that addresses the limitations of traditional storage methods.

Exemplary Techniques for Facilitating AI-Enabled Dispute Resolution Processes

In various scenarios, disputes 182 may arise between or among parties involved in a legal transaction 155 that is being conducted via the legal transaction platform 150 and/or between or among parties involved in a smart contract 265 administered via the legal transaction platform 150. The legal transaction platform 150 can store, execute, and/or provide access to an AI-enabled dispute resolution system 280 that executes automated process to assist with resolving such disputes 182.

Figure 4:
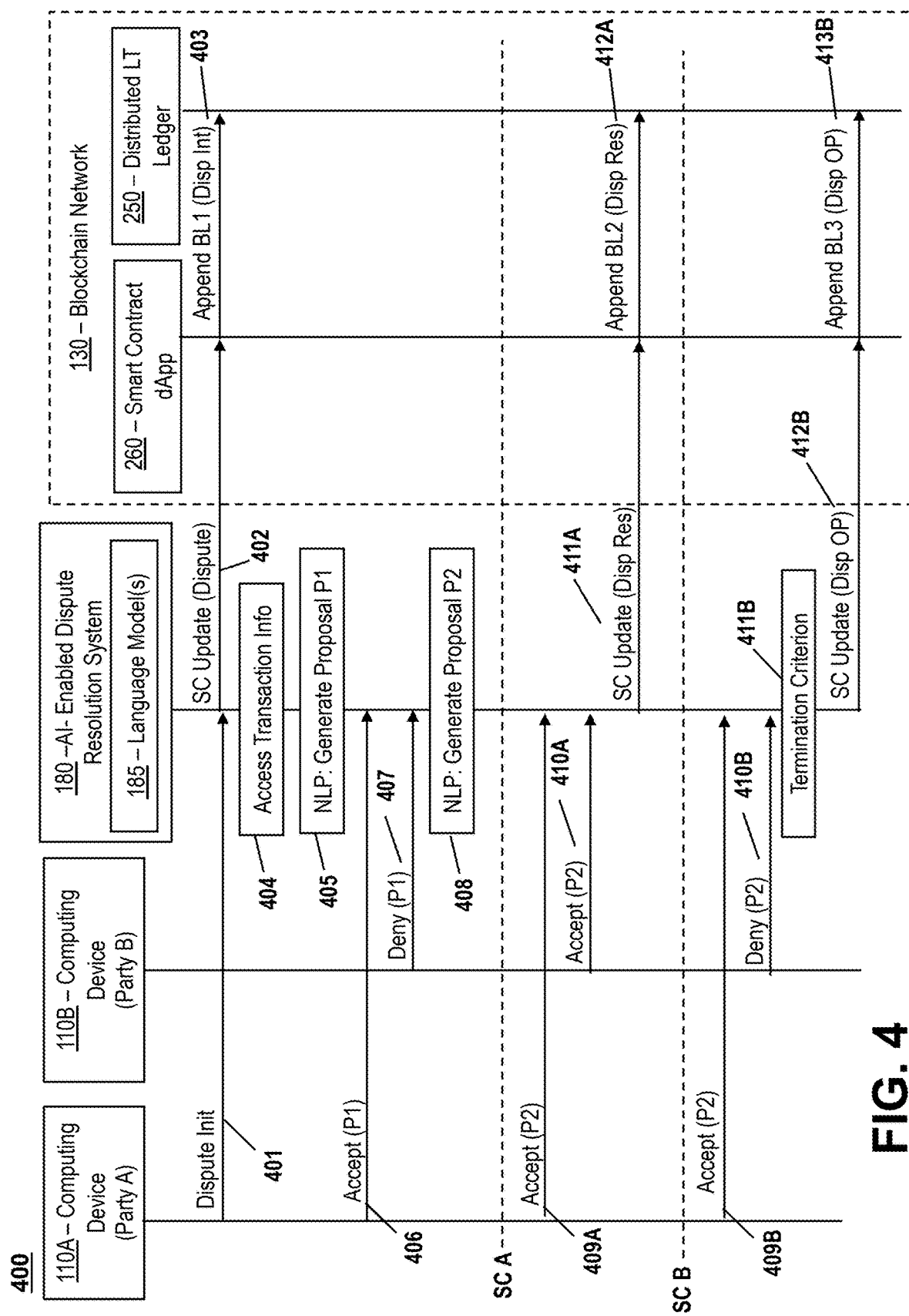
FIG. 4 is a sequence diagram illustrating an exemplary communication exchange among devices in connection with conducting an AI-enabled dispute resolution process in accordance with certain embodiments.

FIG. 4 is a sequence diagram illustrating an exemplary communication exchange 400 among various components in connection with according to certain embodiments. This exemplary communication exchange 400 is intended to demonstrate various functionalities of the AI-enabled dispute resolution system 180 in connection with resolving disputes or conflicts arising from legal transactions 155 and/or smart contracts 265. As discussed below, the AI-enabled dispute resolution system 180 can operate to electronically conduct an arbitration, mediation, and/or other dispute resolution framework between the parties, generate proposals for resolving disputes raised via the legal transaction platform 150, and/or update smart contracts to memorialize agreements that have been reached (or to indicate that the dispute has not been resolved on the platform 150).

The exemplary communication exchange 400 involves electronic communications among a first computing device 110A operated by Party A (e.g., which may correspond to a client end-user 105A), a second computing device 110B operated by Party B (e.g., which may correspond to a legal professional end-user 105B), the AI-enabled dispute resolution system 180, and a blockchain network 130. The AI-enabled dispute resolution system 180 comprises one or more language models 185. A smart contract decentralized application 260 is stored and executed on the blockchain network 130, and a distributed legal transaction ledger 250 records various blocks corresponding to legal transactions 155 conducted using the smart contract decentralized application 260, including blocks corresponding to the dispute or conflict being managed by the AI-enabled dispute resolution system 180.

In some exemplary scenarios, Party A may represent a client-end user that is engaging the legal services of Party B, who represents a legal professional end-user (e.g., an attorney or law firm). The AI-enabled dispute resolution system 180 may be activated to assist with resolving a dispute in response to one of the parties initiating a dispute via a front-end interface 154 provided via the legal transaction platform 150. In other exemplary scenarios, Party A may correspond more generally to an end-user seeking services and Party B may correspond to an end-user that provides services.

In step 401, the first computing device 110A operated by Party A transmits a request to the legal transaction platform 150 to initiate a dispute 182 arising from a legal transaction 155 and/or smart contract 265 involving Party B. The request may include information identifying the parties to the dispute, the legal transaction 155 associated with the dispute, and/or a smart contract 265 associated with the legal transaction 155 or dispute. Although Party A is the one initiating the dispute in this example, it should be noted that Party B could also initiate a dispute.

In certain embodiments, when a party initiates a dispute, a front-end interface 154 provided via the legal transaction platform 150 may enable that party to identify the reason or cause of the dispute and/or to provide supporting documentation. For example, the initiating party may allege that deadlines were missed, dispute payment terms, claim that quality of work was inadequate, and/or specify other reasons for the dispute, and the initiating party may be permitted to provide documentation and/or details in support of its claims. The counterparty involved in the dispute may be notified of the dispute and can provide responses or explanations to the claims raised by the initiating party, as well as supporting documentation. Additionally, the counterparty also may be able to specify counterclaims (e.g., alleging that the initiating party failed to render payment in a timely fashion, failed to satisfy certain milestones of the smart contract, etc.), and provide supporting documentation relating to the counterclaims.

The parties may submit all of the aforementioned information relating to the claims, counterclaims, supporting documentation, and/or other data through interfaces, forms, and/or functions available via the front-end interfaces 154. The front-end interfaces 154 also may include functions or options that enable the parties to initiate the dispute via the AI-enabled dispute resolution system 180.

Any information provided by the parties may be stored by the legal transaction platform 150 in the transaction documentation 152 associated with the legal transaction 155 and/or the dispute 182.

In step 402, the AI-enabled dispute resolution system 180 and/or a language model 185 associated therewith transmits a message (SC Update) to a smart contract dApp 260 on a blockchain network 130 requesting that the smart contract involving Party A and Party B be updated to reflect the dispute.

In step 403, the smart contract dApp 260 appends a block (BL1) to the distributed legal transaction ledger 250 to reflect the initiation of an AI-enabled dispute resolution process involving Party A and Party B. In some embodiments, a confirmation message may be sent to the legal transaction platform 150 and/or the parties upon successfully appending the block to the distributed legal transaction ledger 250 with related details (e.g., indicating the block address, a timestamp indicating when the block was added, etc.).

As discussed below, once a dispute resolution process has been initiated, alanguage model 185 associated with the AI-enabled dispute resolution system 180 may perform various functions in connection with resolving the dispute between Party A and Party B.

In step 404, the language model 185 accesses and analyzes various information associated with the legal transaction 155 and/or smart contract 265 involving Party A and B. The language model 185 may execute one or more natural language processing (NLP) tasks on the information to understand the nature of the legal transaction 155 and/or the cause of the dispute.

The language model 185 can access various transaction documentation 152 pertaining to the legal transaction 155 and/or smart contract 265 involving the parties. In some examples, the language model 185 may retrieve and analyze transaction documentation 152 securely stored in a decentralized storage system 240 and/or on the legal transaction platform 150. The transaction documentation 152 may include documents or data establishing the parties' relationship to each other (e.g., engagement letters establishing attorney-client relationship according to specified terms), the type of legal transaction 155 involved with the smart contract 265 (e.g., a real estate transaction, contract drafting project, civil or criminal court representation, etc.), the scope of work to be performed (e.g., identifying the services to be rendered by Party B in connection with the legal transaction 155 and/or timelines for rendering the services), evidence of services rendered, payment terms (e.g., indicating amounts to be paid by Party A and when amounts come due), and/or other related information.

Additionally, in some examples, the transaction documentation 152 may include communications between Party A and Party B (e.g., which may be extracted from emails, instant message functions, inbox messages, and/or other communication means provided via the platform 150). As mentioned above, the transaction documentation 152 also may include the information collected from the parties that identifies the origins of the dispute, claims asserted by the initiating party, counterclaims asserted by the counterparty, and/or supporting evidence.

In some examples, the language model 185 may execute one or more NLP tasks (e.g., semantic understanding tasks and/or other NLP tasks) on the transaction documentation 152 to extract an understanding of the legal transaction 155 and/or smart contract 265. The language model 185 also may execute one or more NLP tasks to discern an understanding of the alleged causes of the dispute (e.g., indicating the basis of Party A's dispute and/or the basis of any counterclaims submitted by Party B). The language model 185 also may execute one or more NLP tasks to discern whether the supporting documentation supports the claims and/or counterclaims asserted by the parties.

In step 405, the language model 185 generates an initial proposal (Proposal P1) for resolving the dispute based, at least in part, on its analysis of the information associated with the legal transaction 155 and/or smart contract 265 involving Party A and B. The language model 185 may execute one or more NLP tasks (e.g., generative AI functions) to generate the initial proposal.

The content of the proposal generated by the language model 185 can vary greatly based on the nature of the legal transaction and/or causes associated with the dispute. The language model 185 can customize the content of the proposal based on the specific nature of the legal transaction 155 involved with the dispute and/or based on the alleged reasons or causes surrounding the dispute.

In one example, a proposal generated by the language model 185 may involve compensating one party (e.g., Party A) at the expense of the other party (e.g., Party B). In other examples, a proposal generated by the language model 185 may involve modifying the scope of services to be performed by one party (e.g., Party B) and adjusting the payment terms to reflect the modification. Other examples of content that may be included in a proposal could involve extending the timeline for service delivery, offering a partial refund or credit for future services, implementing additional quality assurance measures, and/or requiring additional documentation to ensure compliance with the agreed terms. The proposals may incorporate many other options for resolving a dispute between the parties.

In certain embodiments, both of the parties involved in a dispute must agree to the terms of a proposal generated by the language model 185 before the terms are put into effect. If one party (or both parties) do not accept the terms of the proposal, the proposal is deemed rejected and the terms of the proposal do not go into effect.

At step 406, the first computing device 110A operated by Party A transmits a message to the AI-enabled dispute resolution system 180 accepting the terms of the proposal (Proposal P1) generated by the language model 185.

At step 407, the second computing device 110B operated by Party B transmits a message to the AI-enabled dispute resolution system 180 rejecting the terms of the proposal (Proposal P1) generated by the language model 185.

Because at least one party (in this example, Party B) rejected the initial proposal generated by the language model 185, the initial proposal is deemed to be rejected and does not go into effect. In some embodiments, the party who rejects a proposal may be permitted to specify reasons why the proposal is being rejected to help the language model 185 formulate additional proposals that may be deemed acceptable by both parties.

In step 408, the language model 185 generates a new proposal (Proposal P2) for resolving the dispute between Party A and Party B. In some embodiments, the new proposal may be crafted to take into account any reasons given by the party or parties who rejected the previous proposal. For example, the language model 185 may utilize the specified reasons as an input to executing an NLP task (e.g., a generative AI task) that generates the new proposal.

Steps 405-408 may be iteratively repeated any number of times. For example, the language model 185 may iteratively generate new proposals for consideration by the parties so long as at least one of the parties to the dispute rejects a prior proposal. In certain embodiments, the language model 185 may continuously generate new proposals until a resolution is reached (i.e., a proposal is accepted by both parties) and/or until a termination criterion is reached. The termination criterion may include a request by one or both of the parties to end the dispute resolution process that is being executed by the AI-enabled dispute resolution system 180 and/or to transfer the dispute resolution process off of the platform (e.g., such as to be handled by a court or third-party arbitrator). Additionally, or alternatively, the termination criterion may be reached after the language model 185 generates a predetermined number of proposals that were not accepted by the parties and/or after a predetermined time period has expired.

FIG. 4 illustrates two exemplary scenarios that may occur during a dispute resolution process that is executed by the AI-enabled dispute resolution system 180—Scenario A (SC A) and Scenario B (SC B). Scenario A, which includes steps 409A-412A, illustrates an exemplary process flow that may occur when the AI-enabled dispute resolution system 180 successfully resolves the dispute. Scenario B, which includes steps 409B-413B, illustrates an exemplary process flow that may occur when the AI-enabled dispute resolution system 180 is unable to resolve the dispute.

In step 409A, the first computing device 110A operated by Party A transmits a message to the AI-enabled dispute resolution system 180 accepting the terms of the proposal (Proposal P2) generated by the language model 185.

In step 410A, the second computing device 110B operated by Party B also transmits a message to the AI-enabled dispute resolution system 180 accepting the terms of the proposal (Proposal P2) generated by the language model 185.

In step 411A, the AI-enabled dispute resolution system 180 and/or the language model 185 transmits a message (SC Update) to a smart contract dApp 260 on a blockchain network 130 requesting that the smart contract involving Party A and Party B be updated to reflect the terms agreed upon in the accepted proposal and/or to indicate that the dispute has been resolved.

In step 412A, smart contract dApp 260 appends one or more blocks (BL1) to the distributed legal transaction ledger 250. The one or more blocks may reflect the terms agreed upon in the accepted proposal and/or any corresponding modifications to the terms of the smart contract 265 involving Party A and Party B (e.g., to modify deadlines or payment terms, terminate the smart contract, etc.). The one or more blocks also may indicate that the dispute between Party A and Party B has been resolved. In some embodiments, a confirmation message may be sent to the legal transaction platform 150 and/or the parties upon successfully appending the block to the distributed legal transaction ledger 250 with related details (e.g., indicating the block addresses, timestamps, etc.).

As mentioned above, Scenario B illustrates an exemplary process flow that may occur when the AI-enabled dispute resolution system 180 is unable to resolve the dispute between Party A and Party B.

In step 409B, the first computing device 110A operated by Party A transmits a message to the AI-enabled dispute resolution system 180 accepting the terms of the proposal (Proposal P2) generated by the language model 185.

In step 410B, the second computing device 110B operated by Party B transmits a message to the AI-enabled dispute resolution system 180 rejecting the terms of the proposal (Proposal P2) generated by the language model 185.

In step 411B, a termination criterion is reached that stops the language model 185 from generating further proposals and/or that indicates that the dispute resolution process should be ended. The termination criterion may include a request by Party A or Party B (or both) to end the dispute resolution process and/or to transfer the dispute resolution process off of the platform. Additionally, or alternatively, the termination criterion may be reached after the language model 185 generates a predetermined number of proposals that were not accepted and/or after a predetermined time period has expired.

In step 412B, the AI-enabled dispute resolution system 180 and/or the language model 185 transmits a message (SC Update) to a smart contract dApp 260 on a blockchain network 130 requesting that the smart contract involving Party A and Party B be updated to reflect the dispute has not been resolved and/or is being transferred off of the legal transaction platform 150.

In step 413B, smart contract dApp 260 appends one or more blocks (BL3) to the distributed legal transaction ledger 250. The one or more blocks also may indicate that the dispute between Party A and Party B was not resolved and/or is being transferred off of the platform. In some embodiments, a confirmation message may be sent to the legal transaction platform 150 and/or the parties upon successfully appending the block to the distributed legal transaction ledger 250 with related details (e.g., indicating the block addresses, timestamps, etc.).

Any information and/or documentation generated or collected in connection with the dispute resolution process, whether the dispute is resolved or remains unresolved, may be stored by the transaction platform 150. As mentioned above, in some embodiments, this information can be securely stored in a distributed storage system 240, ensuring data integrity and confidentiality of the data.

Any information appended to the distributed legal transaction ledger 250 of the blockchain network 130 (e.g., such as blocks corresponding to the initiation of a dispute, submitted proposals, accepted or rejected proposal terms, and/or the final disposition) can be done in a manner that maintains confidentiality using the techniques described throughout this disclosure. For instance, the ZKP techniques described herein can be employed to protect sensitive information, ensuring that the validity of statements is confirmed without revealing the underlying data. Additionally, document hashes can be used to safeguard documentation, allowing verification of document integrity without exposing the actual content. By utilizing these cryptographic methods, the data appended to the blockchain ensures that the identities of the parties involved and all details related to the dispute remain confidential, providing a secure and private framework for managing dispute information.

Figure 7:
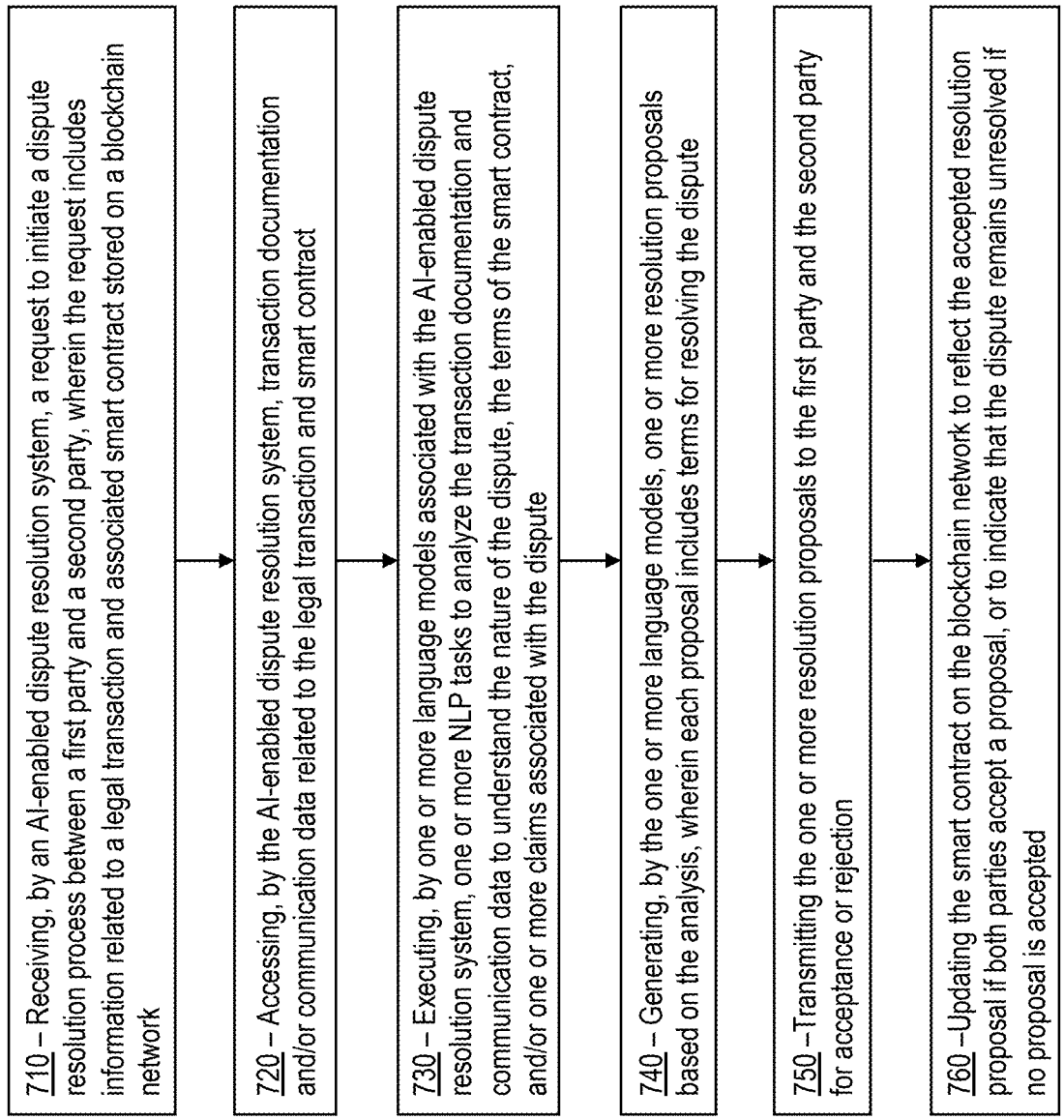
FIG. 7 is a flowchart illustrating an exemplary method for conducting an AI-enabled dispute resolution process in accordance with certain embodiments.

FIG. 7 illustrates a flow chart for an exemplary method 700 for providing an AI-enabled dispute resolution process according to certain embodiments. Method 700 is merely exemplary and is not limited to the embodiments presented herein. Method 700 can be employed in many different embodiments or examples not specifically depicted or described herein. In some embodiments, the steps of method 700 can be performed in the order presented. In other embodiments, the steps of method 700 can be performed in any suitable order. In still other embodiments, one or more of the steps of method 700 can be combined or skipped. In many embodiments, system 100, legal transaction platform 150, and/or AI-enabled dispute resolution system 180 can be configured to perform method 700 and/or one or more of the steps of method 700. In these or other embodiments, one or more of the steps of method 700 can be implemented as one or more computer instructions configured to run at one or more processing devices 102 and configured to be stored at one or more non-transitory computer storage devices 101. Such non-transitory memory storage devices 101 can be part of a computer system such as system 100, server 120, and/or legal transaction platform 150.

In step 710, a request is received by an AI-enabled dispute resolution system 180 to initiate a dispute resolution process between a first party and a second party. The request may include information identifying a legal transaction 155 and/or an associated smart contract 265 stored on a blockchain network 130.

In step 720, the AI-enabled dispute resolution system 180 accesses transaction documentation and/or communication data related to the legal transaction 155 and smart contract 265.

In step 730, one or more NLP tasks are executed by one or more language models 185 associated with the AI-enabled dispute resolution system 180 to analyze the transaction documentation and/or communication data to understand the nature of the dispute, the terms of the smart contract 265, and/or one or more claims associated with the dispute.

In step 740, one or more resolution proposals are generated by the one or more language models based on the analysis, wherein each proposal includes terms for resolving the dispute.

In step 750, the one or more resolution proposals are transmitted to the first party and the second party for acceptance or rejection.

In step 760, the smart contract 265 on the blockchain network 130 is updated to reflect the accepted resolution proposal if both parties accept a proposal, or to indicate that the dispute remains unresolved if no proposal is accepted.

The type and configuration of the language model(s) 185 described herein can vary. Various types of language models 185 can be utilized by the legal transaction platform 150. In some embodiments, the language model 185 can include a large language model (LLM), such as a generative pre-trained transformer (GPT) model (e.g., a GPT-1, GPT-2, GPT-3, GPT-4, or subsequently developed GPT model). Additionally, or alternatively, the language model 185 can include a BERT (Bidirectional Encoder Representations from Transformers) model, an XLNet (Extra-Long Transformer Network) model, a RoBERTa (Robustly Optimized BERT pre-training approach) model, a DeBERTa (Decoding-enhanced BERT with disentangled attention) model, a CTRL (Conditional Transformer Language Model) model, and/or a T5 (Text-to-Text Transfer Transformer) model. These or other types of deep learning or AI language models can be used to implement the language model 185. Additionally, the language model 185 can represent a single model in some embodiments and, in other embodiments, the language model 185 can be comprised of multiple learning models (including any combination of the aforementioned models).

In some embodiments, the language model 185 may be stored and/or hosted on the same server system that stores the legal transaction platform 150. In other embodiments, the language model 185 may be stored on a separate or third-party server system, and the legal transaction platform 150 may communicate with the language model 185 over the network 115 to access the functionalities described herein.

For simplicity purposes, certain portions of this disclosure describe the legal transaction platform 150 as communicating with a single language model 185 to execute AI-powered dispute resolution purposes and/or for other purposes. However, it should be understood that, in some cases, the legal transaction platform 150 can be configured to communicate with a plurality of language models 185 (e.g., two or more language models 185) to perform these functions. Thus, any portion of this disclosure that describes communications with a single language model 185 can be interpreted as communicating with one or more language models 185.

Various types of training procedures can be utilized to train the language model 185. In some cases, one or more supervised or semi-supervised training procedures can be utilized to train the language model 185. Additionally, or alternatively, one or more unsupervised training procedures can be utilized to train the language model 185.

In some embodiments, the language model 185 is trained via a self-supervised training procedure that includes both an unsupervised training phase and a supervised training phase. The unsupervised training phase can include a pre-training step in which the language model 185 is trained on a large corpus of text to learn patterns and relationships between words, phrases, sentences, and/or other human language elements. The supervised training phase can be used for fine-tuning and can train the language model 185 using one or more labeled datasets to facilitate learning of specific natural language processing (NLP) tasks 145, such as language translation, language generation, question answering, text classification, text summarization, etc.

In some embodiments, the training of the language model 185 can include training or fine-tuning the language model 185 on one or more domain-specific datasets comprising information or data related to arbitration, mediation, and/or dispute resolution. Training the language model 185 on this domain-specific data can enable the language model 185 can enable the language model 185 to more accurately comprehend information in connection with resolving disputes that arise on the platform 150, more accurately generate resolution proposals for presentation to the parties involved with the dispute, and/or identify terms for updating smart contracts related to the disputes.

Many additional types of training procedures can be utilized to train the language model 185 described herein.

The AI-enabled dispute resolution system 280 described herein incorporates several technical improvements. Amongst other things, the AI-enabled dispute resolution system 280 leverages LLM technology alongside blockchain integration to streamline dispute resolution processes, while ensuring data confidentiality and minimizing the need for human intervention. As described herein, LLM technologies can be utilized to comprehend various aspects of a dispute, generate proposals for its resolution, and automatically implement agreed-upon terms by modifying or updating smart contracts stored on blockchain networks. Additionally, the techniques for appending data to the blockchain networks permit all information relating to the dispute to be kept confidential. This approach not only enhances the efficiency and security of resolving disputes, but also provides a transparent and automated framework that significantly reduces the potential for human error and bias.

The AI-enabled dispute resolution approach offers significant advantages over traditional methods, which often involve lengthy and expensive proceedings with extensive manual review. By utilizing advanced AI technologies, the system can efficiently analyze vast amounts of data related to a dispute, including transaction documentation, contract terms, communications, and/or supporting documentation. This automated analysis allows for the rapid generation of resolution proposals, reducing the time and resources typically required in manual processes. Furthermore, the integration of blockchain technology ensures that all interactions and agreements are securely recorded, providing an immutable and transparent record that enhances trust between parties. The AI-driven system minimizes human intervention, thereby reducing the potential for bias and error, and streamlining the dispute resolution process, making it more accessible and cost-effective for all parties involved. This approach accelerates the resolution timeline while ensuring confidentiality and security.

Exemplary Tokenized Legal Ecosystems

Figure 5:
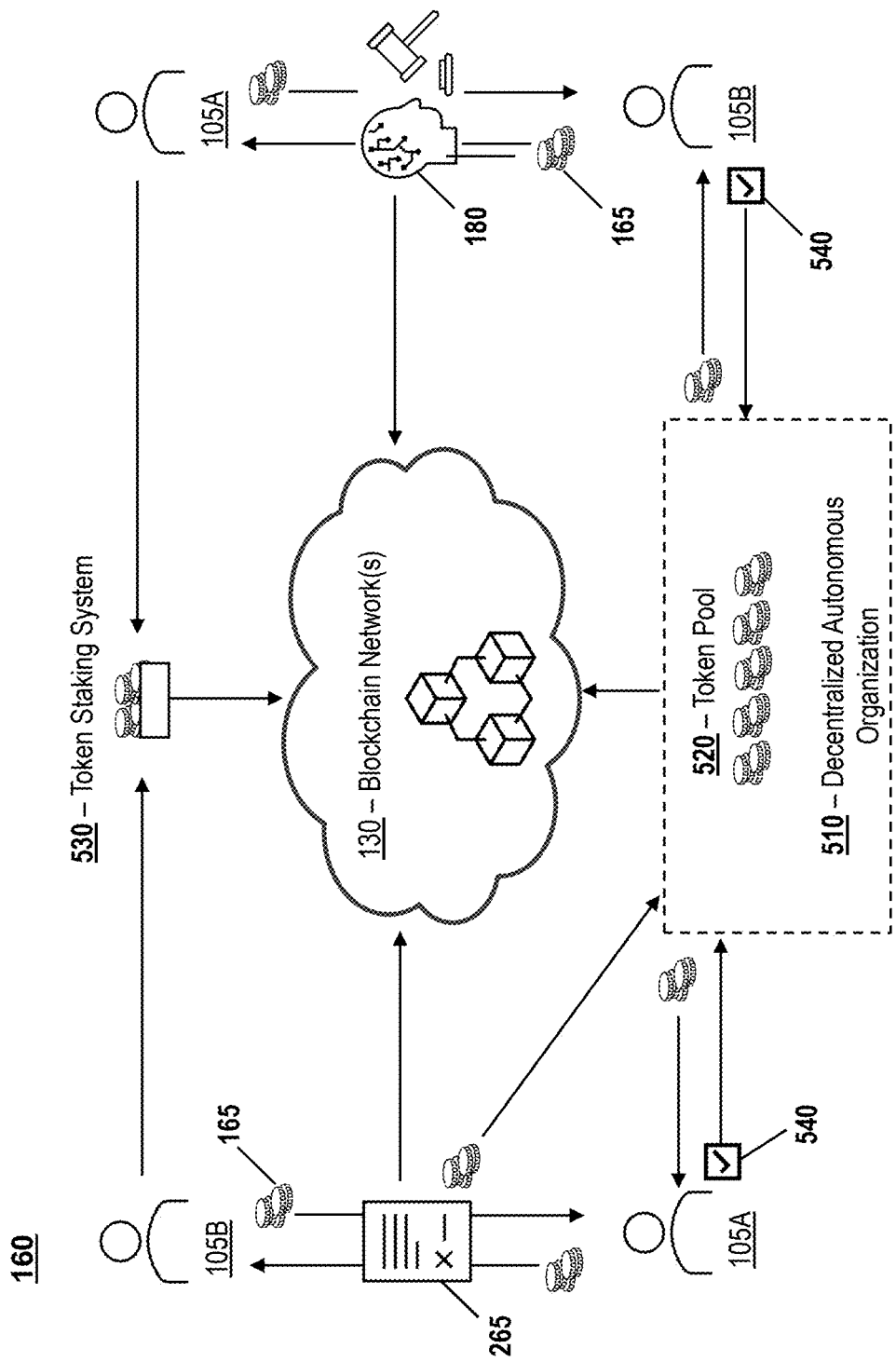
FIG. 5 is a diagram illustrating various aspects of a tokenized legal ecosystem that may be incorporated into the legal transaction platform according to certain embodiments.

FIG. 5 illustrates various aspects of a tokenized legal ecosystem 160 that can be incorporated into the legal transaction platform 150 according to certain embodiments. In certain embodiments, the tokens 165 accessible via the platform serve as the primary medium of exchange within the blockchain-based legal ecosystem. Any or all exchanges of tokens 165 may be tracked and/or recorded on a distributed ledger 250 of a blockchain network 130 in an immutable fashion.

In certain embodiments, a decentralized autonomous organization (DAO) 510 may be given authority to manage a token pool 520 on the legal transaction platform 150. The token pool 520 may initially comprise the entire collection of tokens 165 created for usage on the platform 150, and later may include a subset of tokens that are not owned by end-users 105 and/or that are owned by the platform 150. The decentralized autonomous organization 510 can incorporate a decentralized governance structure in which decisions are made collectively by end-users 105 holding tokens 165 (or, in some cases, specialized governance tokens). In certain embodiments, the DAO framework can leverage smart contracts to automate and enforce rules and operations on a blockchain, enabling all actions to be transparent and publicly auditable. The DAO 510 may record its token pool 520, votes, and proposals on-chain, providing a clear and immutable record of all activities. In certain embodiments, end-users 105 may be incentivized to contribute to governance or development in exchange for receiving tokens 165 for their involvement.

In certain embodiments, the DAO 510 functions by allowing token holders to propose ideas, such as funding grants, protocol changes, and/or platform updates. These proposals may then be subjected to a voting system 540 where tokens 165 determine the voting power of each member. If a proposal is approved by the voting system 540, smart contracts 365 can be used to automatically execute the decision, streamlining the implementation process and ensuring adherence to the community's collective will.

Various mechanisms within the tokenized legal ecosystem 160 can utilized to facilitate the exchange of tokens 165 among end-users and the DAO 510.

The smart contracts 265 described herein can be utilized to facilitate the exchange of tokens 165 in several ways within the tokenized legal ecosystem 160. In some examples, the smart contracts 265 may be utilized to facilitate the exchange of tokens 165 between or among end-users 105. For instance, client end-users 105A may utilize smart contracts 265 to transfer tokens 165 to legal professional end-users 105B in exchange for legal services rendered, and legal professional end-users 105B also can transfer tokens 165 to client end-users 105A for various reasons (e.g., in response to a smart contract being terminated or in order to issue refunds). Additionally, in some embodiments, a portion of the tokens 165 which are the subject of each smart contract 265 involving a client end-user 105A and legal professional end-user 105B may be allocated to the DAO 510 in order to fund the maintenance and/or development of the legal transaction platform 150, including upcoming projects and updates.

The AI-enabled dispute resolution system 180 described herein also can facilitate the exchange of tokens 165 in various ways within the tokenized legal ecosystem 160. In some scenarios, when a dispute arises between end-users 105 involved in a legal transaction 155, the AI-enabled dispute resolution system 180 may hold or place some or all of the tokens 165 associated with the legal transaction 155 in escrow pending the outcome of the dispute resolution process. Additionally, if the parties agree on a proposed resolution, the AI-enabled dispute resolution system 180 can automatically execute the agreed-upon terms by adjusting the allocation of tokens 165. For example, if a client disputes the quality of services rendered by a legal professional, the AI-enabled system might propose a partial refund. Upon acceptance, the system can facilitate the transfer of a portion of the tokens 165 back to the client from an escrow account. In another scenario, if a dispute resolution results in the extension of service deadlines, the system can adjust the token release schedule accordingly, ensuring that tokens 165 are only transferred upon the completion of the revised milestones.

In some embodiments, the tokenized legal ecosystem 160 also may incorporate a token staking system 530 that can facilitate the exchange of tokens 165 within the tokenized legal ecosystem 160. In certain embodiments, the token staking system 530 can permit legal professional end-users 105B and/or client end-users 105A to stake tokens 165 to verify their credibility and enhance their reputation on the legal transaction platform 150. Staking involves locking up a certain amount of tokens 165 (e.g., in a digital wallet or blockchain account) for a period of time, which, in some cases, can help support the network's operations and security. In some embodiments, participants may receive rewards or incentives, such as additional tokens or enhanced platform privileges, for their contribution to maintaining the ecosystem's integrity.

Additionally, by staking tokens 165, legal professional end-users 105B can demonstrate their commitment to providing high-quality legal services, which can increase their visibility and attract more clients. Client end-users 105A, on the other hand, can stake tokens to gain access to a verified network of reputable legal professional end-users 105B.

In certain embodiments, the staking mechanism also can serve as a tool for incentivizing engagement and loyalty among end-users. Legal professional end-users 105B who stake tokens can earn additional rewards, increasing their revenue potential and enhancing their reputation. Clients can benefit from staking by earning loyalty rewards and referral bonuses, which can be redeemed for discounts on future legal services. This system encourages continued participation and fosters a robust ecosystem where both parties are motivated to engage actively.

Additionally, in certain embodiments, the token staking system 530 supports governance decisions on the platform, allowing stakeholders to participate in decision-making processes that affect the development and operation of the platform. By holding and staking tokens, users can influence protocol changes, platform updates, and/or other decisions, ensuring that the ecosystem evolves in a manner that aligns with the collective interests of its end-users.

Any or all exchanges of tokens 165 based on smart contracts 265, end-user exchanges, the AI dispute resolution system, the DAO, the token staking system 530, and/or other ecosystem features can be recorded on a distributed ledger, such as the distributed legal transaction ledger 250 described herein and/or other ledgers, of one or more blockchain networks 130. Recording these exchanges on a distributed ledger provides an immutable audit trail, ensuring that all token transactions are permanently and transparently documented. This capability allows for precise tracking of token exchanges, enhancing accountability and trust among participants. Additionally, the decentralized nature of blockchain technology offers robust security, protecting transaction data from unauthorized alterations and reducing the risk of fraud. By leveraging these benefits, the tokenized legal ecosystem 160 ensures a secure, transparent, and efficient environment for all token-related activities.

In certain embodiments, the legal transaction platform 150 may include an AI chatbot that can facilitate purchases and/or exchanges of tokens 165 in the tokenized legal ecosystem 160 and/or via the platform 150. For example, the end-users may interact or converse with the AI chatbot to purchase tokens 165 on the platform 150, send tokens 165 to other end-users, and/or send requests for tokens 165 to other end-users. The AI chatbot can be configured to communicate with one or more blockchain networks 130 in connection with facilitating the purchases and/or exchanges of the tokens 165. For example, the AI chatbot may append blocks or data to a distributed ledger to reflect any purchases and/or exchanges of the tokens 165. The AI chatbot may implemented using one or more language models 185 (e.g., one or more LLMs) that are trained or fine-tuned on data related to token exchanges.

As evidenced by the disclosure herein, the inventive techniques set forth in this disclosure are rooted in computer technologies that overcome existing problems in systems that store sensitive information, including problems dealing with insecure storage and transmission of sensitive information in conducting transactions. The techniques described in this disclosure provide a technical solution (e.g., one that utilizes blockchain, smart contracts, and/or ZKP cryptographic technologies) for overcoming the limitations associated with known techniques. This technology-based solution marks an improvement over existing capabilities and functionalities by leveraging decentralization and cryptographic technologies to securely conduct transactions while protecting sensitive information corresponding to the transactions.

The inventive techniques set forth in this disclosure also are rooted in computer technologies that overcome existing problems in traditional systems for resolving disputes, including traditional techniques for manually administering arbitrations or mediations. The techniques described in this disclosure provide a technical solution (e.g., one that utilizes a combination of LLM and blockchain technologies) for overcoming the limitations associated with known techniques. This technology-based solution marks an improvement over existing capabilities and functionalities by automating dispute resolution processes with LLM technologies and recording data related to disputes in a distributed ledger maintained on a blockchain network.

In certain embodiments, the techniques described herein can advantageously provide an improvement in the user experience by leveraging the benefits of blockchain and ZKP technologies without requiring end-users to have any technical knowledge related to these technologies. As explained above, the legal transaction platform can operate as an intermediary or middle layer that seamlessly integrates blockchain and zero-knowledge cryptographic functionalities, allowing end-users to engage in secure legal transactions without dealing with the technical complexities of implementing or managing these technologies.

In certain embodiments, the techniques described herein can be used continuously at a scale that cannot be reasonably performed using manual techniques or the human mind. For example, the integration of AI, ZKP, and blockchain technologies enables the automated processing and verification of complex legal transactions, ensuring data privacy and security through cryptographic proofs and decentralized ledgers. These technologies facilitate real-time analysis and decision-making, which require computational power and precision beyond human capabilities, allowing for efficient and secure management of vast amounts of data and transactions.

In a number of embodiments, the techniques described herein can solve a technical problem that arises only within the realm of computer networks, as blockchain and AI technologies do not exist outside the realm of computer networks.

In certain embodiments, a method can be implemented via execution of computing instructions by one or more processing devices and may be configured to be stored on one or more non-transitory storage devices. This method can include providing access to a legal transaction platform that comprises a decentralized network integration system, which may be configured to communicate with one or more blockchain networks to facilitate legal transactions among or between end-users. The method can further include accessing, by the decentralized network integration system, at least one zero-knowledge proof for a first end-user and at least one zero-knowledge proof for a second end-user. Additionally, the method may involve registering, by the decentralized network integration system, verification keys corresponding to the at least one zero-knowledge proof for the first end-user and the at least one zero-knowledge proof for the second end-user on the one or more blockchain networks. The decentralized network integration system can also initiate a smart contract on the one or more blockchain networks corresponding to a legal transaction involving the first end-user and the second end-user, wherein the verification keys corresponding to the at least one zero-knowledge proof from the first end-user and the at least one zero-knowledge proof from the second end-user are utilized to authenticate the first end-user and the second end-user involved with the smart contract. Finally, the method can include updating a state of the smart contract based, at least in part, on the verification keys corresponding to the at least one zero-knowledge proof from the first end-user and the at least one zero-knowledge proof from the second end-user.

In certain embodiments, the legal transaction platform can serve as an intermediary layer situated between devices operated by end-users and the one or more blockchain networks, whereby end-users may not interact directly with one or more blockchain networks and may not require accounts with the one or more blockchain networks. The legal transaction platform can utilize one or more front-end interfaces to collect information from the end-users and may utilize the collected information to communicate with the one or more blockchain networks in connection with registering the verification keys, verifying zero-knowledge proofs associated with smart contracts, and updating states of the smart contracts based, at least in part, on verifications of the zero-knowledge proofs.

In certain embodiments, updating the state of the smart contract based, at least in part, on the verification keys corresponding to the at least one zero-knowledge proof from the first end-user and the at least one zero-knowledge proof from the second end-user can include at least one of validating compliance with regulatory requirements using the at least one zero-knowledge proof from the first end-user or the at least one zero-knowledge proof from the second end-user, verifying one or more digital signatures associated with the smart contract using the at least one zero-knowledge proof from the first end-user or the at least one zero-knowledge proof from the second end-user, verifying one or more payment transactions associated with the smart contract using the at least one zero-knowledge proof from the first end-user or the at least one zero-knowledge proof from the second end-user, or validating services that were rendered using the at least one zero-knowledge proof from the first end-user or the at least one zero-knowledge proof from the second end-user.

In certain embodiments, the at least one zero-knowledge proof for the first end-user and the at least one zero-knowledge proof for the second end-user can correspond to cryptographic constructs generated using one or more proof generation functions on the legal transaction platform, and may permit the first end-user and the second end-user to demonstrate validity of conditions corresponding to the smart contract without revealing sensitive information details. A verification function associated with the smart contract can utilize the verification keys stored on the one or more blockchain networks to validate or verify the at least one zero-knowledge proof for the first end-user and the at least one zero-knowledge proof for the second end-user. The state of the smart contract can be updated in response to the verification function validating or verifying the at least one zero-knowledge proof for the first end-user and the at least one zero-knowledge proof for the second end-user.

In certain embodiments, the decentralized network integration system of the legal transactions can communicate with both the one or more blockchain networks and one or more distributed storage networks in connection with conducting the legal transaction, whereby transaction documentation related to the legal transaction may be stored in a decentralized storage system implemented on the one or more distributed storage networks. One or more distributed ledgers implemented on the one or more blockchain networks can be appended with document hashes that may be utilized to verify integrity of the transaction documentation stored in the decentralized storage system.

In certain embodiments, the second end-user can correspond to a legal professional end-user and the first end-user can correspond to a client end-user seeking legal services of the second end-user in connection with the legal transactions. The smart contract can be established by the legal transaction platform to manage administration of the legal services provided to the client end-user by the legal professional end-user in connection with the legal transaction.

In certain embodiments, the method can further comprise receiving, by the legal transaction platform, a request from the first end-user or the second end-user to initiate a dispute via the legal transaction platform, the request at least identifying the smart contract corresponding to the legal transaction. In response to receiving the request, the method can include executing, by an AI-enabled dispute resolution system stored on the legal transaction platform, an automated dispute resolution process that generates one or more proposals for resolving the dispute and presents the one or more proposals to the first end-user or the second end-user for acceptance or rejection. The method can also include appending one or more blocks to a distributed legal transaction ledger included on the one or more blockchain networks to reflect an outcome of the automated dispute resolution process, wherein the one or more blocks are linked to the smart contract hosted on the one or more blockchain networks.

In certain embodiments, the automated dispute resolution process executed by the AI-enabled dispute resolution system can include executing, by the AI-enabled dispute resolution system, one or more natural language processing (NLP) tasks on transaction documentation corresponding to the dispute to derive an understanding of the dispute, the legal transaction, and/or the smart contract corresponding to the legal transaction. The process can also include executing, by the AI-enabled dispute resolution system, one or more NLP tasks to generate and present the one or more proposals for resolving the dispute. The AI-enabled dispute resolution system may iteratively generate additional proposals for resolving the dispute until a termination criterion is satisfied or until a proposal is accepted by both the first end-user and the second end-user.

In certain embodiments, the legal transaction platform can comprise a tokenized legal ecosystem, and the legal transaction may be initiated into the tokenized legal ecosystem, enabling the first end-user to secure services from the second end-user by exchanging tokens via the legal transaction platform. All exchanges of tokens within the tokenized legal ecosystem can be recorded on a distributed ledger of the one or more blockchain networks in an immutable audit trail of token-related activities.

In certain embodiments, the tokenized legal ecosystem can include a decentralized autonomous organization (DAO) that manages a token pool associated with the tokenized legal ecosystem, and which may incorporate voting functions that permit token-holding end-users to vote on proposals corresponding to the legal transaction platform.

In certain embodiments, a method can be implemented via execution of computing instructions by one or more processing devices and may be configured to be stored on one or more non-transitory storage devices. This method can include providing access to a transaction platform that comprises a decentralized network integration system, which may be configured to communicate with one or more blockchain networks to facilitate transactions among or between end-users. The method can further include accessing, by the decentralized network integration system, at least one zero-knowledge proof for a first end-user and at least one zero-knowledge proof for a second end-user. Additionally, the method may involve registering, by the decentralized network integration system, verification keys corresponding to the at least one zero-knowledge proof for the first end-user and the at least one zero-knowledge proof for the second end-user on the one or more blockchain networks. The decentralized network integration system can also initiate a smart contract on the one or more blockchain networks corresponding to a transaction involving the first end-user and the second end-user, wherein the verification keys corresponding to the at least one zero-knowledge proof from the first end-user and the at least one zero-knowledge proof from the second end-user are utilized to authenticate the first end-user and the second end-user involved with the smart contract. Finally, the method can include updating a state of the smart contract based, at least in part, on the verification keys corresponding to the at least one zero-knowledge proof from the first end-user and the at least one zero-knowledge proof from the second end-user.

In certain embodiments, a system comprises one or more processing devices and one or more non-transitory storage devices for storing instructions. Execution of the instructions by the one or more processing devices causes the one or more processing devices to perform one or more of the steps of the aforementioned method.

In certain embodiments, an AI-enabled dispute resolution method is disclosed. The method is implemented via the execution of computing instructions by one or more processing devices and configured to be stored on one or more non-transitory storage devices. The method comprises: a) receiving, by the AI-enabled dispute resolution system, a request to initiate a dispute resolution process between a first party and a second party, wherein the request includes information related to a legal transaction and associated smart contract stored on a blockchain network; b) accessing, by the AI-enabled dispute resolution system, transaction documentation and communication data related to the legal transaction and smart contract from a decentralized storage system; c) executing, using one or more language models associated with the AI-enabled dispute resolution system, one or more NLP tasks to analyze the transaction documentation and communication data to understand the nature of the dispute, the terms of the smart contract, and/or one or more claims associated with the dispute; d) generating, by the one or more language models, one or more resolution proposals based on the analysis, wherein each proposal includes terms for resolving the dispute; e) presenting the one or more resolution proposals to the first party and the second party for acceptance or rejection; f) updating the smart contract on the blockchain network to reflect the accepted resolution proposal if both parties accept a proposal, or to indicate that the dispute remains unresolved if no proposal is accepted; and g) storing, by the AI-enabled dispute resolution system, the details of the resolution process and any updates to the smart contract in the decentralized storage system.

In certain embodiments, AI-enabled dispute resolution system comprises one or more processing devices and one or more non-transitory storage devices for storing instructions. Execution of the instructions by the one or more processing devices causes the one or more processing devices to perform one or more of the steps of the aforementioned methods.

Embodiments may include a computer program product accessible from a computer-usable or computer-readable medium providing program code for use by or in connection with a computer or any instruction execution system. A computer-usable or computer-readable medium may include any apparatus that stores, communicates, propagates, or transports the program for use by or in connection with the instruction execution system, apparatus, or device. The medium can be a magnetic, optical, electronic, electromagnetic, infrared, or semiconductor system (or apparatus or device) or a propagation medium. The medium may include a computer-readable storage medium, such as a semiconductor or solid-state memory, magnetic tape, a removable computer diskette, a random access memory (RAM), a read-only memory (ROM), a rigid magnetic disk and an optical disk, etc.

A data processing system suitable for storing and/or executing program code may include at least one processor coupled directly or indirectly to memory elements through a system bus. The memory elements can include local memory employed during actual execution of the program code, bulk storage, and cache memories that provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

It should be recognized that any features and/or functionalities described for an embodiment in this application can be incorporated into any other embodiment mentioned in this disclosure. Moreover, the embodiments described in this disclosure can be combined in various ways. Additionally, while the description herein may describe certain embodiments, features, or components as being implemented in software or hardware, it should be recognized that any embodiment, feature, or component that is described in the present application may be implemented in hardware, software, or a combination of the two.

While various novel features of the invention have been shown, described, and pointed out as applied to particular embodiments thereof, it should be understood that various omissions and substitutions, and changes in the form and details of the systems and methods described and illustrated, may be made by those skilled in the art without departing from the spirit of the invention. Amongst other things, the steps in the methods may be carried out in different orders in many cases where such may be appropriate. Those skilled in the art will recognize, based on the above disclosure and an understanding of the teachings of the invention, that the particular hardware and devices that are part of the system described herein, and the general functionality provided by and incorporated therein, may vary in different embodiments of the invention. Accordingly, the description of system components is for illustrative purposes to facilitate a full and complete understanding and appreciation of the various aspects and functionality of particular embodiments of the invention as realized in system and method embodiments thereof. Those skilled in the art will appreciate that the invention can be practiced in other than the described embodiments, which are presented for purposes of illustration and not limitation. Variations, modifications, and other implementations of what is described herein may occur to those of ordinary skill in the art without departing from the spirit and scope of the present invention and its claims.

The invention claimed is:

1. A method implemented via execution of computing instructions by one or more processing devices and configured to be stored on one or more non-transitory storage devices, the method comprising:
providing access to a legal transaction platform that comprises a decentralized network integration system configured to communicate with one or more blockchain networks to facilitate legal transactions among or between end-users, wherein the decentralized network integration system of the legal transaction platform operates an intermediary layer situated between devices operated by the end-users and the one or more blockchain networks, and communicates with the one or more blockchain networks to establish and manage smart contracts corresponding to the legal transactions such that the devices operated by the end-users do not directly interact with the one or more blockchain networks in connection with establishing the smart contracts and verifying zero-knowledge proofs associated with the smart contracts;
accessing, by the decentralized network integration system, at least one zero-knowledge proof for a first end-user and at least one zero-knowledge proof for a second end-user;
registering and storing, by the decentralized network integration system, verification keys on the one or more blockchain networks corresponding to the at least one zero-knowledge proof for the first end-user and the at least one zero-knowledge proof for the second end-user;
initiating, by the decentralized network integration system, a smart contract on the one or more blockchain networks corresponding to a legal transaction involving the first end-user and the second end-user, wherein the smart contract utilizes the verification keys corresponding to the at least one zero-knowledge proof from the first end-user and the at least one zero-knowledge proof from the second end-user that are stored on the one or more blockchain networks to validate one or more parameters of the smart contract; and
updating a state of the smart contract based, at least in part, on the verification keys corresponding to the at least one zero-knowledge proof from the first end-user and the at least one zero-knowledge proof from the second end-user that are stored on the one or more blockchain networks.

2. The method of claim 1, wherein, by positioning of the decentralized network integration system as the intermediary layer, end-users do not interact directly with one or more blockchain networks and do not require accounts with the one or more blockchain networks, and wherein the legal transaction platform utilizes one or more front-end interfaces to collect information from the end-users and utilizes the collected information to communicate with the one or more blockchain networks in connection with registering the verification keys, verifying the zero-knowledge proofs associated with smart contracts, and updating states of the smart contracts based, at least in part, on verifications of the zero-knowledge proofs.

3. The method of claim 1, wherein updating the state of the smart contract based, at least in part, on the verification keys corresponding to the at least one zero-knowledge proof from the first end-user and the at least one zero-knowledge proof from the second end-user comprises at least one of:
validating compliance with regulatory requirements using the at least one zero-knowledge proof from the first end-user or the at least one zero-knowledge proof from the second end-user;
verifying one or more digital signatures associated with the smart contract using the at least one zero-knowledge proof from the first end-user or the at least one zero-knowledge proof from the second end-user;
verifying one or more payment transactions associated with the smart contract using the at least one zero-knowledge proof from the first end-user or the at least one zero-knowledge proof from the second end-user; or validating services that were rendered using the at least one zero-knowledge proof from the first end-user or the at least one zero-knowledge proof from the second end-user.

4. The method of claim 1, wherein:

the at least one zero-knowledge proof for the first end-user and the at least one zero-knowledge proof for the second end-user correspond to cryptographic constructs generated using one or more proof generation functions on the legal transaction platform, and permit the first end-user and the second end-user to demonstrate validity of conditions corresponding to the smart contract without revealing sensitive information details;

a verification function associated with the smart contract utilizes the verification keys stored on the one or more blockchain networks to validate or verify the at least one zero-knowledge proof for the first end-user and the at least one zero-knowledge proof for the second end-user correspond; and the state of the smart contract is updated in response to the verification function validating or verifying the at least one zero-knowledge proof for the first end-user and the at least one zero-knowledge proof for the second end-user.

5. The method of claim 1, wherein the decentralized network integration system of the legal transactions communicates with both the one or more blockchain networks and one or more distributed storage networks in connection with conducting the legal transaction, whereby transaction documentation related to the legal transaction is stored in a decentralized storage system implemented on the one or more distributed storage networks and one or more distributed ledgers implemented on the one or more blockchain networks are appended with document hashes that can be utilized to verify integrity of the transaction documentation stored in the decentralized storage system.

6. The method of claim 1, wherein the second end-user corresponds to a legal professional end-user and the first end-user corresponds to a client end-user seeking legal services of the second end-user in connection with the legal transactions, and the smart contract is established by the legal transaction platform to manage administration of the legal services provided to the client end-user by the legal professional end-user in connection with the legal transaction.

7. The method of claim 1, wherein the method further comprises:

receiving, by the legal transaction platform, a request from the first end-user or the second end-user to initiate a dispute via the legal transaction platform, the request at least identifying the smart contract corresponding to the legal transaction;

in response to receiving the request, executing, by an AI-enabled dispute resolution system stored on the legal transaction platform, an automated dispute resolution process that generates one or more proposals for resolving the dispute and presents the one or more proposals to the first end-user or the second end-user for acceptance or rejection; and appending one or more blocks to a distributed legal transaction ledger included on the one or more blockchain networks to reflect an outcome of the automated dispute resolution process, wherein the one or more blocks are linked to the smart contract hosted on the one or more blockchain networks.

8. The method of claim 7, wherein the automated dispute resolution process executed by the AI-enabled dispute resolution system includes:

executing, by the AI-enabled dispute resolution system, one or more natural language processing (NLP) tasks on transaction documentation corresponding to the dispute to derive an understanding of the dispute, the legal transaction, and/or the smart contract corresponding to the legal transaction; and executing, by the AI-enabled dispute resolution system, one or more NLP tasks to generate and present the one or more proposals for resolving the dispute;

wherein the AI-enabled dispute resolution system iteratively generates additional proposals for resolving the dispute until a termination criterion is satisfied or until a proposal is accepted by both the first end-user and the second end-user.

9. The method of claim 1, wherein:

the legal transaction platform comprises a tokenized legal ecosystem;

the legal transaction is initiated in the tokenized legal ecosystem, enabling the first end-user to secure services from the second end-user by exchanging tokens via the legal transaction platform; and all exchanges of tokens within the tokenized legal ecosystem are recorded on a distributed ledger of the one or more blockchain networks in an immutable audit trail of token-related activities.

10. The method of claim 9, wherein the tokenized legal ecosystem includes a decentralized autonomous organization (DAO) that manages a token pool associated with the tokenized legal ecosystem, and which incorporates voting functions that permit token-holding end-users to vote on proposals corresponding to the legal transaction platform.

11. A system comprising one or more processing devices and one or more non-transitory storage devices for storing instructions, wherein execution of the instructions by the one or more processing devices causes the one or more processing devices to perform functions comprising:

providing access to a legal transaction platform that comprises a decentralized network integration system configured to communicate with one or more blockchain networks to facilitate legal transactions among or between end-users, wherein the decentralized network integration system of the legal transaction platform operates an intermediary layer situated between devices operated by the end-users and the one or more blockchain networks, and communicates with the one or more blockchain networks to establish and manage smart contracts corresponding to the legal transactions such that the devices operated by the end-users do not directly interact with the one or more blockchain networks in connection with establishing the smart contracts and verifying zero-knowledge proofs associated with the smart contracts;

accessing, by the decentralized network integration system, at least one zero-knowledge proof for a first end-user and at least one zero-knowledge proof for a second end-user;

registering and storing, by the decentralized network integration system, verification keys on the one or more blockchain networks corresponding to the at least one zero-knowledge proof for the first end-user and the at least one zero-knowledge proof for the second end-user;

initiating, by the decentralized network integration system, a smart contract on the one or more blockchain networks corresponding to a legal transaction involving the first end-user and the second end-user, wherein the smart contract utilizes the verification keys corresponding to the at least one zero-knowledge proof from the first end-user and the at least one zero-knowledge proof from the second end-user are utilized that are stored on the one or more blockchain networks to validate one or more parameters of the smart contract; and updating a state of the smart contract based, at least in part, on the verification keys corresponding to the at least one zero-knowledge proof from the first end-user and the at least one zero-knowledge proof from the second end-user that are stored on the one or more blockchain networks.

12. The system of claim 11, wherein by positioning of the decentralized network integration system as the intermediary layer, end-users do not interact directly with one or more blockchain networks and do not require accounts with the one or more blockchain networks, and wherein the legal transaction platform utilizes one or more front-end interfaces to collect information from the end-users and utilizes the collected information to communicate with the one or more blockchain networks in connection with registering the verification keys, verifying zero-knowledge proofs associated with smart contracts, and updating states of the smart contracts based, at least in part, on verifications of the zero-knowledge proofs.

13. The system of claim 11, wherein updating the state of the smart contract based, at least in part, on the verification keys corresponding to the at least one zero-knowledge proof from the first end-user and the at least one zero-knowledge proof from the second end-user comprises at least one of:
  validating compliance with regulatory requirements using the at least one zero-knowledge proof from the first end-user or the at least one zero-knowledge proof from the second end-user;
  verifying one or more digital signatures associated with the smart contract using the at least one zero-knowledge proof from the first end-user or the at least one zero-knowledge proof from the second end-user;
  verifying one or more payment transactions associated with the smart contract using the at least one zero-knowledge proof from the first end-user or the at least one zero-knowledge proof from the second end-user; or
  validating services that were rendered using the at least one zero-knowledge proof from the first end-user or the at least one zero-knowledge proof from the second end-user.

14. The system of claim 11, wherein:
  the at least one zero-knowledge proof for the first end-user and the at least one zero-knowledge proof for the second end-user correspond to cryptographic constructs generated using one or more proof generation functions on the legal transaction platform, and permit the first end-user and the second end-user to demonstrate validity of conditions corresponding to the smart contract without revealing sensitive information details;
  a verification function associated with the smart contract utilizes the verification keys stored on the one or more blockchain networks to validate or verify the at least one zero-knowledge proof for the first end-user and the at least one zero-knowledge proof for the second end-user correspond; and
  the state of the smart contract is updated in response to the verification function validating or verifying the at least one zero-knowledge proof for the first end-user and the at least one zero-knowledge proof for the second end-user.

15. The system of claim 11, wherein the decentralized network integration system of the legal transactions communicates with both the one or more blockchain networks and one or more distributed storage networks in connection with conducting the legal transaction, whereby transaction documentation related to the legal transaction is stored in a decentralized storage system implemented on the one or more distributed storage networks and one or more distributed ledgers implemented on the one or more blockchain networks are appended with document hashes that can be utilized to verify integrity of the transaction documentation stored in the decentralized storage system.

16. The system of claim 11, wherein the second end-user corresponds to a legal professional end-user and the first end-user corresponds to a client end-user seeking legal services of the second end-user in connection with the legal transactions, and the smart contract is established by the legal transaction platform to manage administration of the legal services provided to the client end-user by the legal professional end-user in connection with the legal transaction.

17. The system of claim 11, wherein execution of the instructions by the one or more processing devices further causes the one or more processing devices to perform functions comprising:
  receiving, by the legal transaction platform, a request from the first end-user or the second end-user to initiate a dispute via the legal transaction platform, the request at least identifying the smart contract corresponding to the legal transaction;
  in response to receiving the request, executing, by an AI-enabled dispute resolution system stored on the legal transaction platform, an automated dispute resolution process that generates one or more proposals for resolving the dispute and presents the one or more proposals to the first end-user or the second end-user for acceptance or rejection; and
  appending one or more blocks to a distributed legal transaction ledger included on the one or more blockchain networks to reflect an outcome of the automated dispute resolution process, wherein the one or more blocks are linked to the smart contract hosted on the one or more blockchain networks.

18. The system of claim 17, wherein the automated dispute resolution process executed by the AI-enabled dispute resolution system includes:
  executing, by the AI-enabled dispute resolution system, one or more natural language processing (NLP) tasks on transaction documentation corresponding to the dispute to derive an understanding of the dispute, the legal transaction, and/or the smart contract corresponding to the legal transaction; and
  executing, by the AI-enabled dispute resolution system, one or more NLP tasks to generate and present the one or more proposals for resolving the dispute;
  wherein the AI-enabled dispute resolution system iteratively generates additional proposals for resolving the dispute until a termination criterion is satisfied or until a proposal is accepted by both the first end-user and the second end-user.

19. The system of claim 11, wherein:
the legal transaction platform comprises a tokenized legal ecosystem;
the legal transaction is initiated in the tokenized legal ecosystem, enabling the first end-user to secure services from the second end-user by exchanging tokens via the legal transaction platform; and
all exchanges of tokens within the tokenized legal ecosystem are recorded on a distributed ledger of the one or more blockchain networks in an immutable audit trail of token-related activities;
wherein the tokenized legal ecosystem includes a decentralized autonomous organization (DAO) that manages a token pool associated with the tokenized legal ecosystem, and which incorporates voting functions that permit token-holding end-users to vote on proposals corresponding to the legal transaction platform.

20. A method implemented via execution of computing instructions by one or more processing devices and configured to be stored on one or more non-transitory storage devices, the method comprising:
providing access to a transaction platform that comprises a decentralized network integration system configured to communicate with one or more blockchain networks to facilitate transactions among or between end-users, wherein the decentralized network integration system of the transaction platform operates an intermediary layer situated between devices operated by the end-users and the one or more blockchain networks, and communicates with the one or more blockchain networks to establish and manage smart contracts corresponding to the transactions such that the devices operated by the end-users do not directly interact with the one or more blockchain networks in connection with establishing the smart contracts and verifying zero-knowledge proofs associated with the smart contracts;
accessing, by the decentralized network integration system, at least one zero-knowledge proof for a first end-user and at least one zero-knowledge proof for a second end-user;
registering and storing, by the decentralized network integration system, verification keys corresponding to the at least one zero-knowledge proof for the first end-user and the at least one zero-knowledge proof for the second end-user on the one or more blockchain networks;
initiating, by the decentralized network integration system, a smart contract on the one or more blockchain networks corresponding to a transaction involving the first end-user and the second end-user, wherein the smart contract utilizes the verification keys corresponding to the at least one zero-knowledge proof from the first end-user and the at least one zero-knowledge proof from the second end-user that are stored on the one or more blockchain networks to validate one or more parameters of the smart contract; and
updating a state of the smart contract based, at least in part, on the verification keys corresponding to the at least one zero-knowledge proof from the first end-user and the at least one zero-knowledge proof from the second end-user.

* * * * *